United States Patent [19]
Sirkar

[11] Patent Number: 5,993,515
[45] Date of Patent: Nov. 30, 1999

[54] APPARATUS AND PROCESS FOR SELECTIVELY REMOVING A COMPONENT FROM A MULTICOMPONENT AQUEOUS SOLUTION BY PERVAPORATION

[75] Inventor: Kamalesh K. Sirkar, Berkeley Heights, N.J.

[73] Assignee: New Jersey Institute of Technology, Newark, N.J.

[21] Appl. No.: 08/972,437

[22] Filed: Nov. 18, 1997

Related U.S. Application Data

[63] Continuation-in-part of application No. 08/645,509, May 14, 1996, Pat. No. 5,753,009, and application No. 08/972,027, Nov. 17, 1997.

[51] Int. Cl.⁶ .......................... B01D 19/00; B01D 53/22; B01D 61/36
[52] U.S. Cl. .................. 95/46; 95/50; 96/6; 96/8; 210/640; 210/321.8; 210/321.89
[58] Field of Search .............. 95/44, 45, 47–55, 95/46; 96/4, 5, 7–14, 6; 55/524; 210/640, 644, 321.6, 321.72, 321.8, 321.89

[56] References Cited

U.S. PATENT DOCUMENTS

| | | | |
|---|---|---|---|
| Re. 33,502 | 12/1990 | Gollan .......................................... | 95/45 |
| 3,339,341 | 9/1967 | Maxwell et al. .............................. | 95/53 |
| 4,230,463 | 10/1980 | Henis et al. .................................. | 95/47 |
| 4,268,279 | 5/1981 | Shindo et al. ................................ | 95/46 |
| 4,483,901 | 11/1984 | Okita et al. ............................... | 96/12 X |
| 4,553,983 | 11/1985 | Baker ............................................ | 95/50 |
| 4,583,996 | 4/1986 | Sakata et al. ................................ | 95/50 |
| 4,659,343 | 4/1987 | Kelly ............................................ | 95/46 |
| 4,696,686 | 9/1987 | Usami et al. ................................. | 96/13 |
| 4,734,106 | 3/1988 | Gollan ......................................... | 55/16 |
| 4,750,918 | 6/1988 | Sirkar .......................................... | 95/44 |
| 4,789,468 | 12/1988 | Sirkar ........................................ | 210/137 |
| 4,824,444 | 4/1989 | Nomura .................................... | 96/12 X |
| 4,880,441 | 11/1989 | Kesting et al. .............................. | 95/47 |
| 4,881,955 | 11/1989 | Bikson et al. ............................... | 95/54 |
| 4,900,626 | 2/1990 | Fabre ....................................... | 95/52 X |

(List continued on next page.)

FOREIGN PATENT DOCUMENTS 62-33521  2/1987  Japan .......................................... 95/45

OTHER PUBLICATIONS

Baker, et al., J. Membrane Sci., 31, 259–71 (1987).
A.K. Guha et al., Ind. Eng. Chem. Res., 31, 593–604 (1992).
Henis et al. (1981) J. Membrane Sci., 8, 233–46.
Kimmerle et al., J. Membrane Sci., 36, 477–88 (1988).
Pinnau et al., J. Membrane Sci., 37,81–8 (1988).
Sidhoum et al. (1988) AIChE J. 34:417–25.
Strathmann et al., Pure and Applied Chem., 58 (12), 1663–8 (1986).

*Primary Examiner*—Robert Spitzer
*Attorney, Agent, or Firm*—Klauber & Jackson

[57] ABSTRACT

A pervaporation process for selectively removing a component from a multicomponent aqueous solution which is practiced with an assembly comprising a feed chamber for holding and introducting the multicomponent aqueous solution to be treated therein, the feed chamber having a pressure, an exit chamber having a pressure, and located adjacent to the feed chamber and downstream thereof; at least one membrane composite located between the feed chamber and the exit chamber and adapted for fluid registry therewith, the membrane composite comprised of a porous membrane having a first and second surface, and a nonporous membrane permanently disposed on the second surface of the porous membrane, and having a permeability selective to the component, the membrane composite aligned such that the nonporous membrane is connected to the feed chamber; and a vacuum pump connected to the exit chamber for evacuating the component from the chamber. The process comprises the steps of introducing the multicomponent aqueous solution into the feed chamber, evacuating the component from the exit chamber, so that the pressure in the exit chamber is less than the pressure in the feed chamber, contacting the multicomponent aqueous solution with the first surface of the porous membrane.

42 Claims, 13 Drawing Sheets

U.S. PATENT DOCUMENTS

| | | | |
|---|---|---|---|
| 4,906,256 | 3/1990 | Baker et al. | 95/48 |
| 4,921,612 | 5/1990 | Sirkar | 210/644 |
| 4,929,357 | 5/1990 | Schucker | 95/50 X |
| 4,931,181 | 6/1990 | Blume et al. | 95/51 X |
| 4,959,151 | 9/1990 | Nakatani et al. | 95/50 X |
| 4,960,519 | 10/1990 | Pasternak et al. | 95/50 X |
| 4,960,520 | 10/1990 | Semmens | 210/640 |
| 4,973,434 | 11/1990 | Sirkar et al. | 264/4 |
| 4,990,255 | 2/1991 | Blume et al. | 96/13 X |
| 4,997,569 | 3/1991 | Sirkar | 210/637 |
| 5,002,590 | 3/1991 | Friesen et al. | 95/52 |
| 5,013,437 | 5/1991 | Trimmer et al. | 95/47 X |
| 5,032,148 | 7/1991 | Baker et al. | 95/50 |
| 5,053,132 | 10/1991 | Sirkar | 210/500.23 |
| 5,071,451 | 12/1991 | Wijmans | 95/48 X |
| 5,078,755 | 1/1992 | Tozawa et al. | 95/46 |
| 5,085,776 | 2/1992 | Blume et al. | 96/13 X |
| 5,089,033 | 2/1992 | Wijmans | 95/49 X |
| 5,100,555 | 3/1992 | Matson | 95/46 X |
| 5,108,464 | 4/1992 | Friesen et al. | 95/52 |
| 5,131,266 | 7/1992 | Hassett | 210/644 X |
| 5,194,158 | 3/1993 | Matson | 95/46 |
| 5,199,962 | 4/1993 | Wijmans | 95/48 X |
| 5,205,843 | 4/1993 | Kaschemekat et al. | 95/49 X |
| 5,236,474 | 8/1993 | Schofield | 95/47 |
| 5,256,296 | 10/1993 | Baker et al. | 95/45 X |
| 5,281,254 | 1/1994 | Birbara et al. | 95/44 |
| 5,282,964 | 2/1994 | Young et al. | 95/45 X |
| 5,354,469 | 10/1994 | Babcock | 96/12 X |
| 5,501,722 | 3/1996 | Toy et al. | 95/45 X |
| 5,558,776 | 9/1996 | Steinhauser et al. | 210/640 |
| 5,582,735 | 12/1996 | Mancusi, III et al. | 95/50 X |
| 5,611,842 | 3/1997 | Friesen et al. | 95/50 |
| 5,753,009 | 5/1998 | Sirkar et al. | 95/50 X |

APPARATUS AND PROCESS FOR SELECTIVELY REMOVING A COMPONENT FROM A MULTICOMPONENT AQUEOUS SOLUTION BY PERVAPORATION

CROSS REFERENCE TO RELATED APPLICATION

This application is a continuation in part of U.S. Ser. No. 08/645,509 filed on May 14, 1996, and entitled "Method and Apparatus for Selectively Removing a Component from a Multicomponent Gas/Vapor Mixture." This application is also a continuation in part of U.S. Ser. No. 08/972,027 filed on Nov. 17, 1997 and entitled "A Pervaporation Process for Selectively removing a Component from a Multicompoent Aqueous Solution, and Assembly for Practicing Said Process", now U.S. Pat. No. 5,753,009.

GOVERNMENT SUPPORT

This research was conducted under SERDP grant number EPA-371-94 administered through the Northeast Hazardous Substance Research Center of the U.S. Environmental Protection Agency. The Government may have rights in the invention.

FIELD OF INVENTION

This invention relates to the removal of a component from a multicomponent aqueous solution, and more particularly, a pervaporation process and apparatus for such removal.

BACKGROUND OF THE INVENTION

In recent years, there has been an increased awareness of the potential contamination of groundwater with nonaqueous phase liquids (NAPLs), which include, but are not limited to nonvolatile oils, alcohols, and volatile organic compounds (VOCs) such as benzene, toluene, xylene, perchloroethylene, and trichloroethylene. Many of these contaminants in groundwater supplies have originated from the excessive and widespread use of chlorinated hydrocarbons as degreasers, leaks from underground storage tanks, leachate from municipal and industrial landfill sites, or releases in industrial effluent streams. In light of the increasing amounts of contaminants, the U.S. Environmental Protection Agency (EPA) has established standards for the quality of drinking water. Moreover, methods have been developed to remove NAPLs and VOCs from underground water supplies before such supplies enter the water system. One such method is to pump the groundwater to the surface, treat it to remove from it any NAPLs, and then return the water to the aquifer. However, this method has met with only limited success.

An alternative method, Surfactant-Enhanced Aquifer Remediation (SEAR), is of increasing interest, especially where NAPLs are present in the ground water. In the SEAR process, an appropriately formulated aqueous solution of a suitable surfactant with or without alcohols or suitable polymers is pumped underground to mix with the contaminated groundwater. While underground, the surfactant solution forms micelles having a polar exterior and a hydrophobic interior, which trap VOCs, high boiling point oils, and polymers contaminating the groundwater. The micellar multicomponent aqueous solution is then collected and purified on the surface to recover the contaminants. Also, the micellar aqueous solution can then be used again to remove more VOCs from underground.

One of the principal methods used to purify the micellar aqueous solution is pervaporation, wherein the multicomponent aqueous solution to be purified is placed in contact with one side of a membrane, and the permeate is removed as a low pressure vapor from the other side of the membrane [Feng, X. And Huang, Y., *Ind. Eng. Chem. Res.,* 36(4) :1048–1066 (1997)]. The membrane may be symmetric or asymmetric in structure. Moreover, the membrane may be made of only one material, or more than one material. If the membrane is made of more than one material, it may be referred to as a "membrane composite."

In a conventional pervaporation process, the membrane composite may be in the form of a hollow fiber made of porous material having a bore, an inner surface, and an outer surface, and nonporous membrane disposed on the outer surface. A vacuum or sweep gas is used to lower the partial pressure in the bore of the fiber. The ulticomponent aqueous solution is then permitted to make contact with the nonporous membrane disposed on the outer surface of the fiber. The permeate then diffuses first through the nonporous membrane disposed on the outer surface of the hollow fiber, then through the porous membrane into the bore of the hollow fiber, where the permeate can be collected in vapor form.

However, the above known method has certain inherent limitations. For example, the volume of the hollow fiber bore is typically extremely small. Hence, when the permeate in vapor form reaches the hollow fiber bore, a pressure buildup may result which can reduce the driving force for pervaporation. Moreover, if the multicomponent aqueous solution contains some high-boiling point oils, then under the pressure difference applied across the membrane composite, these oils can permeate through the nonporous membrane and appear as a liquid throughout the porous membrane. Hence, the oil may clog the pores of the porous membrane, as well as the hollow fiber bore itself, thereby creating a pressure drop and drastically reducing the efficiency of the pervaporation process.

Another problem experienced with the above known method was the collection of a large volume of water because water being volatile, could dissolve into the membrane composite and permeate therethrough.

In an effort to overcome these problems, attempts have been made at a tube-side feed mode of operation, wherein the multicomponent aqueous solution contacts the inner nonporous inner surface of the hollow fiber membrane composite, and wherein the permeate diffuses to the outer surface for collection in an exit chamber defined by a shell surrounding the hollow fiber membrane composite. With this arrangement, a possible pressure buildup which could result in decreased pervaporation efficiency is avoided because of the increased volume of the exit chamber as compared with that of the hollow fiber bore.

However, this arrangement possesses a limitation in that there is a permeate side pressure drop in the porous membrane.

SUMMARY OF THE INVENTION

There is provided, in accordance with the invention, a process for selectively removing a component from a multicomponent aqueous solution, and an apparatus for selectively removing a component from a multicomponent aqueous solution, that do not possess the shortcomings of the pervaporation methods and apparatuses described above. Also provided is a hollow fiber membrane composite module which can be used with the present invention.

One embodiment of the present invention is a process for selectively removing a component from a multicomponent aqueous solution, which is practiced by use of a separation apparatus, comprising a feed chamber having a pressure, and for holding and introducing the multicomponent aqueous solution to be treated therein, an exit chamber having a pressure, and located adjacent to the feed chamber and downstream thereof, and at least one membrane composite located between the feed chamber and the exit chamber and adapted for fluid registry therewith. The membrane composite is comprised of a porous membrane having a first and second surface, and a nonporous membrane permanently disposed on the second surface of the porous membrane, and having a permeability selective to the component selectively removed with the present invention. Moreover, the membrane composite is aligned such that the nonporous membrane is connected to the exit chamber and the first surface of the porous membrane is connected to the feed chamber. An evacuation means for evacuating the component from the exit chamber is connected to the exit chamber. The process for selectively removing at least one component from a multicomponent aqueous solution comprises the steps of introducing the multicomponent aqueous solution into the feed chamber, evacuating the exit chamber such that the pressure in the exit chamber is less than the pressure in the feed chamber, and contacting the multicomponent aqueous solution with the first surface of the porous membrane.

The porous membrane in the process can be asymmetric or symmetric in structure. Preferably, the porous membrane is asymmetric in structure. More preferably, a shell surrounds the membrane composite, and the porous membrane is at least one hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell and the nonporous membrane permanently disposed on the outer surface of the hollow fiber.

The porous membrane in the process is a hydrophobic microporous membrane. Preferably, the hydrophobic microporous membrane is made of a material selected from the group consisting of polypropylene, polyethylene, polytrimethylpentene, polytetrafluoroethylene, polyvinylidene difluoride, and polysulfone. More preferably, the hydrophobic microporous membrane is made of polypropylene with pores having a size in the range of about 6 to about 500 Å.

The nonporous membrane material in the process is a nonporous rubbery material. Preferably, the nonporous rubbery material is selected from the group consisting of polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, and polyethers. More preferably, the nonporous rubbery material is an ultrathin layer of plasma polymerized nonporous silicone.

The evacuation means of the process is a sweep fluid means or a vacuum means. Preferably, the evacuation means is a vacuum means, more preferably an oil-less vacuum pump connected to the exit chamber.

As stated above, the pressure in the exit chamber is less than the pressure of the feed chamber. Preferably, the pressure in the feed chamber is approximately 7 to approximately 30 psig, and the pressure in the exit chamber is approximately −27.0 to approximately −29.0 or more inch Hg.

Thus, the present invention is a process for selectively removing at least one component from a multicomponent aqueous solution, by which the process is practiced by use of a separation assembly, the assembly comprising a feed chamber having a pressure, and for holding and introducing the multicomponent aqueous solution to be treated therein, an exit chamber having a pressure, and located adjacent to the feed chamber and downstream thereof, and at least one membrane composite located between the feed chamber and the exit chamber and adapted for fluid registry therewith. The membrane composite is comprised of a microporous polypropylene membrane having a first and second surface with pores having a size in the range of about 6 to about 500 Å, and an ultrathin plasma polymerized nonporous silicone membrane permanently disposed on the second surface of the microporous polypropylene membrane. The ultrathin plasma polymerized nonporous silicone membrane has a permeability selective to the component removed from the multicomponent aqueous solution.

A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the hollow fiber and is defined by the shell and the ultrathin plasma polymerized nonporous silicone membrane permanently disposed on the outer surface of the microporous polypropylene hollow fiber. The membrane composite is aligned such that the ultrathin plasma polymerized nonporous silicone membrane is connected to the exit chamber and the first surface of the polypropylene membrane is connected to the feed chamber. An oil-less vacuum pump for evacuating the component selectively removed from the multicomponent aqueous solution, that permeates into the exit chamber, is connected to the exit chamber. The pressure in the exit chamber is about −27 to about −29.0 or more inch Hg, and the pressure in the feed chamber is approximately 7 to approximately 30 psig.

The process for selectively removing a component from a multicomponent aqueous solution comprises the steps of introducing the multicomponent aqueous solution into the feed chamber, evacuating the exit chamber such that the pressure in the exit chamber is less than the pressure in the feed chamber, and contacting the multicomponent aqueous solution with the first surface of the microporous polypropylene membrane.

The component selectively separated from the multicomponent aqueous solution is at least one member of the group consisting of a volatile organic compound, and a high boiling point oil. The volatile organic compound includes, but is not limited to, benzene, toluene, xylene, perchloroethylene, or trichloroethylene.

The process can further comprise a condensing means for condensing the component evacuated from the exit chamber. Preferably, the condensing means is at least one condenser in a dry ice methanol bath in a dewar flask, wherein the condenser is connected to the exit chamber and the evacuation means. However, higher temperatures may be employed in the condenser.

The porous membrane of the process further comprising a condensing means can be asymmetric or symmetric in structure. Preferably, the porous membrane is asymmetric in structure. More preferably, a shell surrounds the membrane composite, and the porous membrane is a hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell and the nonporous membrane permanently disposed on the outer surface of the hollow fiber. The shell can have a bottom exit, whose use is described below.

The porous membrane in the process further comprising a condensing means is a hydrophobic microporous membrane. Preferably, the hydrophobic microporous membrane is made of a material selected from the group consisting of polypropylene, polyethylene, polytrimethylpentene, polytetrafluoroethylene, polyvinylidene difluoride, and polysulfone. More preferably, the hydrophobic microporous membrane is made of polypropylene with pores having a size in the range of about 6 to about 500 Å.

The nonporous membrane material in the process further comprising a condensing means is a nonporous rubbery material. Preferably, the nonporous rubbery material is selected from the group consisting of polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, and polyethers. More preferably, the nonporous rubbery material is an ultrathin layer of plasma polymerized nonporous silicone.

Hence, in another embodiment, the present invention is a process for selectively removing a component from a multicomponent aqueous solution, by which the process is practiced by use of a separation assembly, the assembly comprising a feed chamber having a pressure, and for holding and introducing the multicomponent aqueous solution to be treated therein, an exit chamber having a pressure, and located adjacent to the feed chamber and downstream thereof, at least one membrane composite located between the feed chamber and the exit chamber and adapted for fluid registry therewith, wherein the membrane composite is comprised of a microporous polypropylene membrane having a first and second surface with pores having a size in the range of about 6 to about 500 Å, and an ultrathin plasma polymerized nonporous silicone membrane permanently disposed on the second surface of the microporous polypropylene membrane, and having a permeability selective to the component.

A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the microporous polypropylene hollow fiber and is defined by the shell and the ultrathin plasma polymerized nonporous silicone layer permanently disposed on the outer surface of the microporous polypropylene hollow fiber.

The hollow fiber membrane composite is aligned such that the ultrathin plasma polymerized nonporous silicone layer is connected to the exit chamber and the first surface of the microporous polypropylene membrane is connected to the feed chamber.

The evacuation means comprises an oil-less vacuum pump connected to the exit chamber for evacuating the component from the exit chamber. The condensing means comprises at least one condenser in a dry ice methanol bath in a dewar flask, wherein the condenser is connected to the exit chamber and the oil-less vacuum pump. However, higher temperatures may be employed in the condenser.

The pressure in the exit chamber is about −27 to about −29.0 or more inch Hg, and the pressure in the feed chamber is approximately 7 to approximately 30 psig.

The process for selectively removing a component from a multicomponent aqueous solution comprises the steps of introducing the multicomponent aqueous solution into the feed chamber, evacuating the exit chamber such that the pressure in the exit chamber is less than the pressure in the feed chamber, contacting the multicomponent aqueous solution with the first surface of the microporous polypropylene membrane, and condensing the component selectively removed from the multicomponent aqueous solution.

The component selectively removed from the multicomponent aqueous solution is at least one member of the group consisting of a volatile organic compound, and a high boiling point oil. The volatile organic compound includes, but is not limited to benzene, toluene, xylene, perchloroethylene, and trichloroethylene.

An assembly for selectively removing a component from a multicomponent aqueous solution is also disclosed. This assembly comprises a feed chamber having a pressure, and for holding and introducing a multicomponent aqueous solution to be treated therein, an exit chamber having a pressure, and located adjacent to the feed chamber and downstream thereof, at least one membrane composite located between the feed chamber and the exit chamber and adapted for fluid registry therewith, and an evacuation means connected to the exit chamber for evacuating the component from the exit chamber. The membrane composite is comprised of a porous membrane having a first and second surface, and a nonporous membrane permanently disposed on the second surface of the porous membrane, and having a permeability selective to the component. The membrane composite is aligned such that the nonporous membrane is connected to the exit chamber and the first surface of the porous membrane is connected to the feed chamber.

The porous membrane in the assembly can be asymmetric or symmetric in structure. Preferably, the porous membrane is asymmetric in structure. More preferably, a shell surrounds the membrane composite, and the porous membrane is at least one hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell and the nonporous membrane permanently disposed on the outer surface of the hollow fiber. The shell may have a bottom exit, whose use is described below.

The porous membrane in the assembly is a hydrophobic microporous membrane. Preferably, the hydrophobic microporous membrane is made of a material selected from the group consisting of polypropylene, polyethylene, polytrimethylpentene, polytetrafluoroethylene, polyvinylidene difluoride, and polysulfone. More preferably, the hydrophobic microporous membrane is made of polypropylene, with pores having a size in the range of about 6 to about 500 Å.

The nonporous membrane material in the assembly is made of a nonporous rubbery material. Preferably, the nonporous rubbery material is selected from the group consisting of polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, and polyethers. More preferably, the nonporous membrane is an ultrathin layer of plasma polymerized nonporous silicone.

The evacuation means in the assembly is a sweep fluid means or a vacuum means. Preferably, the evacuation means is a vacuum means. More preferably, the evacuation means is an oil-less vacuum pump connected to the exit chamber.

It is important that the pressure in the exit chamber of the assembly is less than the pressure of the feed chamber. Preferably, the pressure in the feed chamber is approximately 7 to approximately 30 psig, and the pressure in the exit chamber is approximately –27.0 to approximately –29.0 or more inch Hg.

As a result, one embodiment of the assembly for selectively removing a component from a multicomponent aqueous solution comprises a feed chamber having a pressure, and for holding and introducing the multicomponent aqueous solution to be treated therein, an exit chamber having a pressure, and located adjacent to the feed chamber and downstream thereof, at least one membrane composite located between the feed chamber and the exit chamber and adapted for fluid registry therewith, wherein the membrane composite is comprised of a microporous polypropylene membrane having a first and second surface with pores having a size in the range of about 6 to about 500 Å, and an ultrathin plasma polymerized nonporous silicone membrane permanently disposed on the second surface of the porous membrane, and having a permeability selective to the component. A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the hollow fiber and is defined by the shell and the ultrathin plasma polymerized nonporous silicone membrane permanently disposed on the outer surface of the hollow fiber. The shell can have a bottom exit for removing high boiling point oils, as described below.

The membrane composite is aligned such that the ultrathin plasma polymerized I nonporous silicone membrane is connected to the exit chamber and the first surface of the microporous polypropylene membrane is connected to the feed chamber.

The evacuation means comprises an oil-less vacuum pump connected to the exit chamber for evacuating the component from the exit chamber. The pressure in the exit chamber is about –27 to about –29.0 or more inch Hg and the pressure in the feed chamber is approximately 7 to approximately 30 psig.

The component separated is at least one member of the group consisting of a volatile organic compound, and a high boiling point oil. The volatile organic compound includes, but is not limited to benzene, toluene, xylene, and trichloroethylene. When a high boiling point oil is being separated from the multicomponent aqueous solution, it is preferred that the hollow fiber membrane composite is at an angle to the horizontal so that the high boiling point oil can drop vertically from the hollow fiber membrane composite, and be removed from the exit chamber at the bottom exit of the shell.

The assembly can further comprise a condensing means for condensing the component evacuated from the exit chamber. Preferably, the condensing means is at least one condenser in a dry ice methanol bath in a dewar flask, wherein the condenser is connected to the exit chamber and the evacuation means. However, higher temperatures may be employed in the condenser.

In this assembly further comprising a condensing means, the porous membrane can be symmetric or asymmetric in structure. Preferably, the porous membrane is asymmetric in structure. More preferably, a shell surrounds the membrane composite, and the porous membrane is a hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell and the nonporous membrane permanently disposed on the outer surface of the hollow fiber.

The porous membrane in the assembly further comprising a condensing means, is a hydrophobic microporous membrane. Preferably, the hydrophobic microporous membrane is made of a material selected from the group consisting of polypropylene, polyethylene, polytrimethylpentene, polytetrafluoroethylene, polyvinylidene difluoride and polysulfone. More preferably, the hydrophobic microporous membrane is made of polypropylene with pores having a size in the range of about 6 to about 500 Å.

The nonporous membrane in the assembly further comprising a condensing means is made of a nonporous rubbery material. Preferably, the nonporous rubbery material is selected from the group consisting of polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, and polyethers. More preferably, the nonporous rubbery material is an ultrathin layer of plasma polymerized nonporous silicone.

It is important that the pressure in the exit chamber of the assembly further comprising a condensing means is less than the pressure of the feed chamber.

Preferably, the pressure in the feed chamber is approximately 7 to approximately 30 psig, and the pressure in the exit chamber is approximately –27.0 to approximately –29.0 or more inch Hg.

Hence, another embodiment of the present invention is an assembly for selectively removing a component from a multicomponent aqueous solution comprising a feed chamber for holding and introducing the multicomponent aqueous solution to be treated therein, an exit chamber located adjacent to the feed chamber and downstream thereof, at least one membrane composite located between the feed chamber and the exit chamber and adapted for fluid registry therewith, wherein the membrane composite is comprised of a microporous polypropylene membrane having a first and second surface with pores having a size in the range of about 6 to about 500 Å, and an ultrathin plasma polymerized nonporous silicone membrane permanently disposed on the second surface of the microporous polypropylene membrane, and having a permeability selective to the component. A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the hollow fiber and is defined by the shell and the ultrathin plasma polymerized nonporous silicone membrane permanently disposed on the outer surface of the hollow fiber.

The membrane composite is aligned such that the ultrathin plasma polymerized nonporous silicone membrane is connected to the exit chamber and the first surface of the microporous polypropylene membrane is connected to the feed chamber.

The embodiment also has an evacuation means connected to the exit chamber, and an oil-less vacuum pump for evacuating the component from the exit chamber. There is also a condensing means comprising at least one condenser in a dry ice methanol bath in a dewar flask for condensing the component evacuated from the exit chamber, which is connected to the exit chamber and the oil-less vacuum pump.

The pressure in the exit chamber is about −27 to about −29.0 or more inch Hg, and the pressure in the feed chamber is approximately 7 to approximately 30 psig.

The component selectively removed from the multicomponent aqueous solution is at least one member of the group consisting of a volatile organic compound, and a high boiling point oil. The volatile organic compound includes, but is not limited to benzene, toluene, xylene, perchloroethylene, and trichloroethylene.

When a high boiling point oil is selectively removed from the multicomponent aqueous solution, the hollow fiber membrane composite should be at an angle to the horizontal so that the high boiling point oil can drop vertically from the hollow fiber membrane composite and be removed from the exit chamber at the bottom exit of the shell.

Also disclosed is a hollow fiber membrane composite module for selectively removing a component from a multicomponent aqueous solution. This module can be used in the present invention in that it contains at least one membrane composite. The module comprises at least one hollow fiber membrane composite having a bore, an inner surface, and an outer surface, wherein the at least one hollow fiber membrane composite is comprised of a porous hollow fiber membrane having an inner surface and an outer surface, and a nonporous membrane permanently disposed on the outer surface, the nonporous membrane having a permeability selective to the component, a feed chamber defined by the bore of the at least one hollow fiber membrane composite, a shell that surrounds the at least one hollow fiber membrane composite, and an exit chamber that surrounds the at least one hollow fiber membrane composite which is defined by the shell and the nonporous membrane permanently disposed on the outer surface of the at least one hollow fiber.

The module can be positioned so that the multicomponent aqueous solution can flow into the feed chamber and make contact with the porous inner surface of the at least one hollow fiber membrane composite, and then flow out of the feed chamber and the module. Moreover, the positioning of the module permits the connection of the exit chamber surrounding the at least one hollow fiber membrane composite to the evacuation means of the present invention. As a result, the evacuation means can remove from the exit chamber the component selectively removed from the multicomponent aqueous solution, and prevent a pressure buildup therein.

The porous hollow fiber membrane of the module is a hydrophobic microporous membrane. Preferably, the hydrophobic microporous membrane is made of a material selected from the group consisting of polypropylene, polyethylene, polytrimethylpentene, polytetrafluoroethylene, polyvinylidene difluoride, and polysulfone. More preferably, the hydrophobic microporous membrane is made of polypropylene with pores having a size in the range of about 6 to about 500 Å.

The nonporous membrane of the module is made of a rubbery nonporous material. Preferably, the rubbery nonporous material is selected from the group consisting of polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, and polyethers. More preferably, the nonporous rubbery material is an ultrathin layer plasma polymerized nonporous silicone.

As stated above, the module contains at least one hollow fiber membrane composite. In one embodiment, the module contains 75 hollow fiber membrane composites positioned such that the multicomponent aqueous solution can flow into the module and make contact with porous inner surface of the 75 hollow fiber membrane composites concurrently, then flow out of the 75 hollow fiber membrane composites concurrently and exit the module.

In another embodiment of the hollow fiber membrane composite, the diameter of the shell is two inches, and module contains at least 10,000 parallel hollow fiber membrane composites.

Accordingly, one object of the present invention is to have the multicomponent aqueous solution contact the first side of the porous membrane of the membrane composite and to reduce the pressure at the nonporous membrane of the membrane composite relative to the pressure at the first surface of the porous membrane of the membrane composite. If the membrane composite is a hollow fiber, the multicomponent solution is located in the bore of the hollow fiber, and makes contact with the first side of the porous surface of the hollow fiber membrane composite. The component which is removed from the multicomponent aqueous solution then permeates first through the porous membrane, and then through the nonporous membrane, to the exit chamber. Applicant has discovered that this arrangement results in a much more efficient removal of the component from the multicomponent aqueous solution as compared to conventional pervaporation arrangements, wherein the feed chamber is connected to the nonporous membrane of the membrane composite.

Another object of the present invention is to increase the volume of the exit chamber so as to avoid a buildup of the component which is removed from the multicomponent aqueous solution. In the present invention, the exit chamber surrounds the hollow fiber membrane composite. As a result, the exit chamber of the present invention is much larger than the exit chamber used in conventional pervaporation systems and methods, whereas a potential buildup of vapor in the exit chamber of the component removed from the multicomponent aqueous solution, and hence a decrease in the efficiency of the pervaporation process, is avoided.

Yet another object of the present invention is to increase the amount of the component separated from an aqueous solution relative to the amount of water collected.

Yet still another object of the present invention is to permit the concurrent removal of at least one volatile organic compound and a high boiling point oil from a multicomponent aqueous solution.

Still yet another object of the present invention is to remove a component from a multicomponent aqueous solution regardless of whether a surfactant is present in the multicomponent aqueous solution.

Furthermore, the present invention permits the hydrophobic microporous membrane to remain dry when the multicomponent aqueous solution contains no surfactants. For a hydrophobic porous membrane, water will not wet the pores of the hydrophobic porous membrane. Hence, the pores will be filled with trapped air, and any component, such as a VOC in the multicomponent aqueous solution, will enter the trapped air and then permeate through the nonporous membrane to the exit chamber. Moreover, if the multicomponent aqueous solution contains a surfactant, the multicomponent aqueous solution will wet the hydrophobic porous membrane. This wetting will produce a "liquid membrane" that is very appealing to nonpolar contaminants such as VOCs and high boiling point oils. These nonpolar contaminants will form a layer around the nonporous membrane at the second surface of the porous membrane, and hence reduce water flux. As a result, the pervaporation process of the present invention is more efficient than conventional pervaporation processes or assemblies.

BRIEF DESCRIPTION OF THE DRAWINGS

Understanding of the present invention and the various aspects thereof will be facilitated by reference to the accompanying drawing figures, submitted for purposes of illustration only and not intended to limit the scope of the invention.

DESCRIPTION OF THE INVENTION

Figure 1:
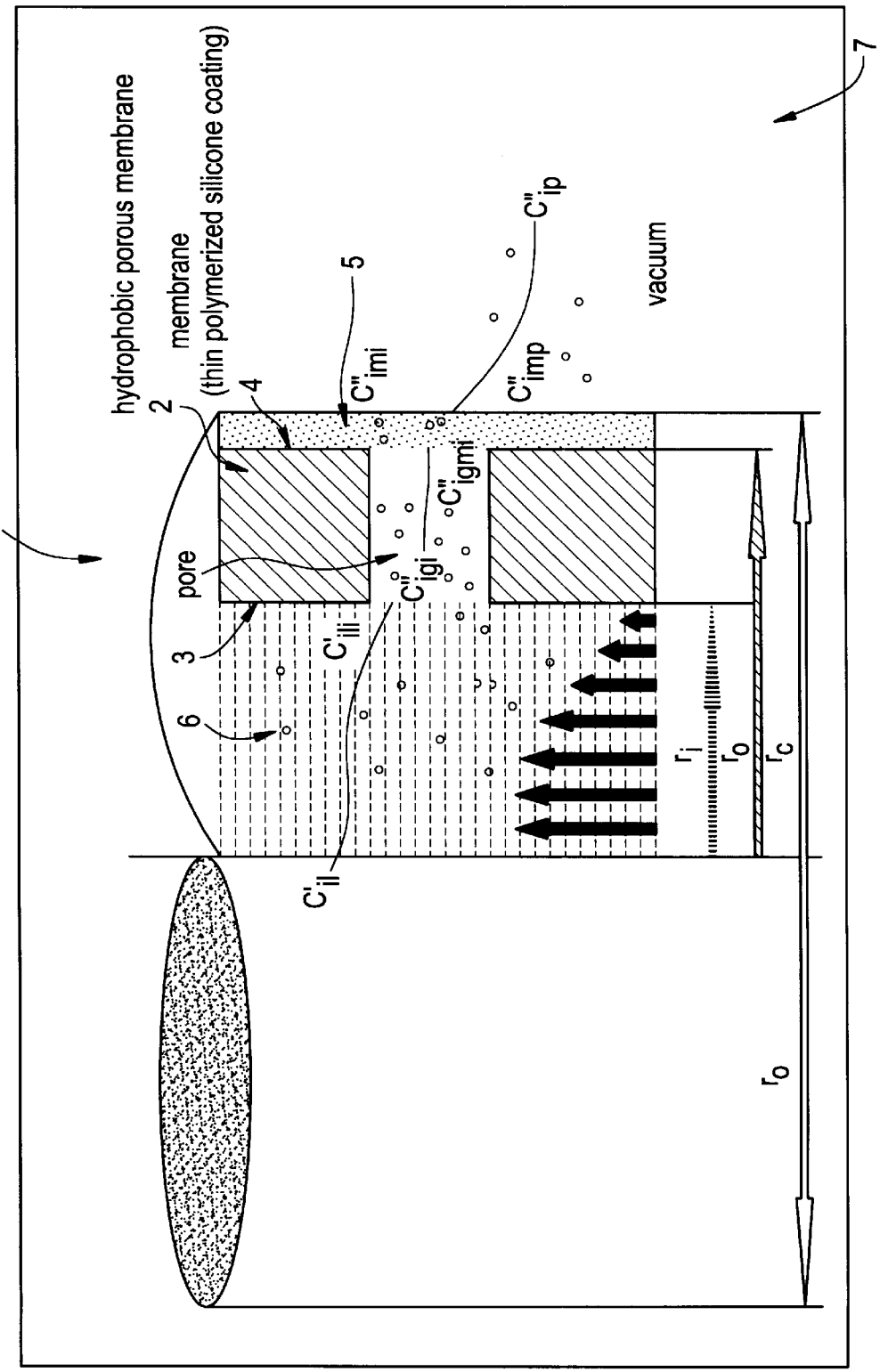
FIG. 1 is a schematical view of the concentration profile of VOC in a hollow fiber membrane composite of the present invention for non-wetted pore conditions, and of the solute concentration profiles in the multicomponent aqueous solution, the gas-filled pore of the hydrophobic microporous membrane, the ultrathin plasma polymerized nonporous silicone membrane permanently disposed on the outer surface of the hollow fiber membrane composite, and the exit chamber.

Process for Selectively Removing a Component from a Multicomponent Aqueous Solution Applicant has discovered a tube side feed mode of pervaporation, wherein a membrane composite having a porous membrane, and nonporous membrane permanently disposed thereon, is positioned such that the multicomponent solution makes contact with the porous membrane and the component selectively separated from the multicomponent aqueous solution permeates first through the porous membrane, and then through the nonporous membrane to an evacuated exit chamber, is much more efficient in removing components from multicomponent aqueous solutions than conventional shell side pervaporation modes, wherein, the multicomponent aqueous solution contacts the nonporous membrane, and the component permeates first through the nonporous membrane and then through the porous membrane to an evacuated exit chamber. Hence, applicant discloses a process for selectively removing a component from a multicomponent aqueous solution, by which the process is practiced by use of a separation assembly, the assembly comprising a feed chamber for holding and introducing the multicomponent aqueous solution to be treated therein, the feed chamber having a pressure; an exit chamber having a pressure, and located adjacent to the feed chamber and downstream thereof, at least one membrane composite located between the feed chamber and the exit chamber and adapted for fluid registry therewith. The membrane composite is comprised of a porous membrane having a first and second surface, and a nonporous membrane permanently disposed on the second surface of the porous membrane, and having a permeability selective to the component. The membrane composite is aligned such that the nonporous membrane is connected to the exit chamber and the first surface of the porous membrane is connected to the feed chamber. There is also an evacuation means connected to the exit chamber for evacuating the component from the exit chamber.

The process comprises the steps of introducing the multicomponent aqueous solution into the feed chamber, evacuating the exit chamber such that the pressure in the exit chamber is less than the pressure in the feed chamber, and contacting the multicomponent aqueous solution with the first surface of the porous membrane.

The porous membrane can be symmetric or asymmetric in structure. In particular, a shell surrounds the at least one membrane composite, and the porous membrane is a hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell and the nonporous membrane permanently disposed on the outer surface of the hollow fiber. The shell can have a bottom exit, the use of which is described below.

Regardless of the structure of the porous membrane, it is important that the pressure in the exit chamber is less than the pressure in the feed chamber.

In this process, the porous membrane is a hydrophobic microporous membrane, which is made of a material selected from the group consisting of polypropylene, polyethylene, polytrimethylpentene, polytetrafluoroethylene, polyvinylidene difluoride and polysulfone. Preferably, the hydrophobic microporous membrane is made of polypropylene with pores in the porous membrane having a size in the range of about 6 to about 500 Å.

The nonporous membrane in the process is made of a nonporous rubbery material, such as polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, or polyethers. Preferably, the nonporous membrane is an ultrathin layer of plasma polymerized nonporous silicone.

The evacuation means used in the process is a sweep fluid means or a vacuum means. Preferably, the evacuation means is an oil-less vacuum pump connected to the exit chamber.

Hence, one embodiment of the present invention is a process for selectively removing at least one component from a multicomponent aqueous solution, by which the process is practiced by use of a separation assembly, the assembly comprising a feed chamber having a pressure, and for holding and introducing the multicomponent aqueous solution to be treated therein, an exit chamber having a pressure, and located adjacent to the feed chamber and downstream thereof, at least one membrane composite located between the feed chamber and the exit chamber and adapted for fluid registry therewith, wherein the membrane composite is comprised of a microporous polypropylene membrane having a first and second surface with pores having a size in the range of about 6 to about 500 Å, and an ultrathin plasma polymerized nonporous silicone membrane permanently disposed on the second surface of the microporous polypropylene membrane, and having a permeability selective to the component removed from the multicomponent aqueous solution. A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the hollow fiber and is defined by the shell and the ultrathin plasma polymerized nonporous silicone membrane permanently disposed on the outer surface of the hollow fiber.

The membrane composite is aligned such that the ultrathin plasma polymerized nonporous silicone membrane is connected to the exit chamber and the first surface of the microporous polypropylene membrane is connected to the feed chamber. An oil-less vacuum pump for evacuating from the exit chamber the component selectively removed from the multicomponent aqueous solution is connected to the exit chamber. The pressure in the exit chamber is about −27 to about −29.0 or more inch Hg and the pressure in the feed chamber is approximately 7 to approximately 30 psig.

The process for selectively removing a component from a multicomponent aqueous solution comprises the steps of introducing the multicomponent aqueous solution into the feed chamber, evacuating the exit chamber such that the pressure in the exit chamber is less than the pressure in the feed chamber, and contacting the multicomponent aqueous solution with the first surface of the microporous polypropylene membrane.

The component selectively removed from the multicomponent aqueous solution is at least one member of the group consisting of a volatile organic compound, and a high boiling point oil. The volatile organic compound includes, but is not limited to, benzene, toluene, xylene, perchloroethylene, or trichloroethylene.

If the component is a high boiling point oil, it is preferred the hollow fiber membrane composite is at an angle to the horizontal so that the high boiling point oil can drop vertically from the hollow fiber membrane composite and be removed from the exit chamber at a bottom exit of the shell.

A condensing means can be incorporated into the process in order to condense the component evacuated from the exit chamber. More specifically, the condensing means is a condenser in a dry ice methanol bath in a dewar flask, wherein the condenser is connected to the exit chamber and the evacuation means. However, higher temperatures may be employed in the condenser.

As a result, the process described above can further comprise the step of condensing the component selectively removed from the multicomponent aqueous solution.

The porous membrane in the process further comprising the step of condensing the component can be symmetric or asymmetric in structure. In particular, a shell surrounds the membrane composite, and the porous membrane is a hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell surrounding the hollow fiber and nonporous membrane permanently disposed on the outer surface of the hollow fiber. The shell can have a bottom exit, the use of which is described below.

Regardless of the structure of the porous membrane used in the process further comprising a condensing means, it is important that the pressure in the exit chamber is lower than the pressure in the feed chamber. Preferably, the pressure in the feed chamber is approximately 7 to approximately 30 psig, and the pressure in the exit chamber is approximately −27.0 to approximately −29.0 or more inch Hg.

In such a process, the porous membrane is a hydrophobic microporous membrane, which is made of a material selected from the group consisting of polypropylene, polyethylene, polytrimethylpentene, polytetrafluoroethylene, polyvinylidene difluoride and polysulfone. Preferably, the porous membrane is made of polypropylene, and the pores in the porous membrane of this process have a size in the range of about 6 to about 500 Å.

The nonporous membrane is made of a nonporous rubbery material, such as polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, or polyethers. In particular, the nonporous membrane is an ultrathin layer of plasma polymerized nonporous silicone.

Hence, another embodiment of the present invention is a process for selectively removing at least one component from a multicomponent aqueous solution, by which the process is practiced by use of a separation assembly, the assembly comprising a feed chamber having a pressure, and for holding and introducing the multicomponent aqueous solution to be treated therein, an exit chamber having a pressure, and located adjacent to the feed chamber and downstream thereof, at least one membrane composite located between the feed chamber and the exit chamber and adapted for fluid registry therewith, the membrane composite is comprised of a microporous polypropylene membrane having a first and second surface with pores having a size in the range of about 6 to about 500 Å, and an ultrathin plasma polymerized nonporous silicone membrane permanently disposed on the second surface of the microporous polypropylene membrane, and having a permeability selective to the component removed from the multicomponent aqueous solution. A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the hollow fiber and is defined by the shell and the ultrathin plasma polymerized membrane permanently disposed on the outer surface of the hollow fiber.

The membrane composite is aligned such that the ultrathin plasma polymerized nonporous silicone membrane is connected to the exit chamber and the first surface of the microporous polypropylene membrane is connected to the feed chamber. An oil-less vacuum pump for evacuating the component or components selectively removed from the multicomponent aqueous solution that permeate into the exit chamber, is connected to the exit chamber. The pressure in the exit chamber is about −27 to about −29.0 or more inch Hg and the pressure in the feed chamber is approximately 7 to approximately 30 psig.

The process for selectively removing a component from a multicomponent aqueous solution further comprising the condensing of the component, comprises the steps of introducing the multicomponent aqueous solution into the feed chamber, evacuating the exit chamber such that the pressure in the exit chamber is less than the pressure in the feed chamber, contacting the multicomponent aqueous solution with the inner surface of the microporous polypropylene hollow fiber, and condensing the component selectively removed from the multicomponent aqueous solution.

The component selectively removed from the multicomponent aqueous solution with the process further comprising the condensing of the component, is at least one member of the group consisting of a volatile organic compound, and a high boiling point oil. The volatile organic compound includes, but is not limited to, benzene, toluene, xylene, perchloroethylene, or trichloroethylene.

When the component is a high boiling point oil, it is preferred that the hollow fiber membrane composite is at an angle to the horizontal. Hence, high boiling point oils which permeate through the hollow fiber membrane composite to the exit chamber can drop vertically from the ultrathin plasma polymerized membrane of the hollow fiber membrane composite, and be removed at the bottom exit of the shell.

Assembly for Selectively Removing a Component from a Multicomponent Aqueous Solution Also disclosed is an assembly for selectively removing a component from a multicomponent aqueous solution, the assembly comprising a feed chamber having a pressure, and for holding and introducing the multicomponent aqueous solution to be treated therein, an exit chamber having a pressure, and located adjacent to the feed chamber and downstream thereof, at least one membrane composite located between the feed chamber and the exit chamber and adapted for fluid registry therewith. The membrane composite is comprised of a porous membrane having a first and second surface, and a nonporous membrane permanently disposed on the second surface of the porous membrane, and having a permeability selective to the component. The membrane composite is aligned such that the nonporous membrane is connected to the exit chamber and the first surface of the porous membrane is connected to the feed chamber. There is also an evacuation means connected to the exit chamber for evacuating the component from the exit chamber.

In the assembly, the porous membrane can be symmetric or asymmetric in structure. In particular a shell surrounds the membrane composite, and the porous membrane is a hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell and the nonporous membrane permanently disposed on the outer surface of the hollow fiber. The shell can also have a bottom exit, the use of which is described below.

Regardless, of the structure of the porous membrane in the assembly, it is important that the pressure in the exit chamber is less than the pressure in the feed chamber.

Preferably, the pressure in the feed chamber is approximately 7 to approximately 30 psig, and the pressure in the exit chamber is approximately −27.0 to approximately −29.0 or more inch Hg.

The porous membrane of the membrane composite in this assembly is a hydrophobic microporous membrane, which is made of a material such as polypropylene, polyethylene, polytrimethylpentene, polytetrafluoroethylene, polyvinylidene difluoride or polysulfone. Preferably, the porous membrane is made of polypropylene with pores having a size in the range of about 6 to about 500 Å.

The nonporous membrane of the assembly is made of a nonporous rubbery material, such as polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, or polyethers. Preferably, the nonporous membrane is an ultrathin layer of plasma polymerized nonporous silicone.

The evacuation means of the assembly for selectively removing a component from a multicomponent aqueous solution is a sweep fluid means or a vacuum means. Preferably, the vacuum means is an oil-less vacuum pump connected to the exit chamber.

Hence, yet another embodiment of the present invention is an assembly for selectively separating a component from a multicomponent aqueous solution, comprising a feed chamber having a pressure, and for holding and introducing the multicomponent aqueous solution to be treated therein, an exit chamber having a pressure, and located adjacent to the feed chamber and downstream thereof, at least one membrane composite located between the feed chamber and the exit chamber and adapted for fluid registry therewith, wherein the membrane composite is comprised of a microporous polypropylene membrane having a first and second surface with pores having a size in the range of about 6 to about 500 Å, and an ultrathin plasma polymerized nonporous silicone membrane permanently disposed on the second surface of the microporous polypropylene membrane, and having a permeability selective to the component removed from the multicomponent aqueous solution. A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the hollow fiber and is defined by the shell and the ultrathin plasma polymerized nonporous silicone membrane permanently disposed on the outer surface of the hollow fiber. The shell can also have a bottom exit, whose use is described below.

The membrane composite is aligned such that the ultrathin plasma polymerized nonporous silicone membrane is connected to the exit chamber and the first surface of the microporous polypropylene membrane is connected to the feed chamber. An oil-less vacuum pump for evacuating from the exit chamber the component selectively removed from the multicomponent aqueous solution is connected to the exit chamber. The pressure in the exit chamber is about $-27$ to about $-29.0$ or more inch Hg and the pressure in the feed chamber is approximately 7 to approximately 30 psig.

Moreover, the assembly can include a condensing means, such as at least one condenser in a methanol dry ice bath in a dewar flask, wherein the condenser is connected to the exit chamber and the evacuation means. However, higher temperatures can be used in the condensing means.

In such an assembly, where the component selectively separating from a multicomponent aqueous solution is condensed, the porous membrane can be symmetric or asymmetric in structure. In particular, a shell surrounds the membrane composite, and the porous membrane is a hollow fiber having a bore, an inner surface, and an outer surface, such that the inner surface corresponds to the first surface of the porous membrane, the outer surface corresponds to the second surface of the porous membrane, the bore corresponds to the feed chamber, and the exit chamber surrounds the hollow fiber and is defined by the shell and the nonporous membrane permanently disposed on the outer surface of the hollow fiber.

However, regardless of the structure of the porous membrane, it is important that the pressure in the exit chamber is less than the pressure in the feed chamber. Preferably, the pressure in the feed chamber is approximately 7 to approximately 30 psig, and the pressure in the exit chamber is approximately $-27.0$ to approximately $-29.0$ or more inch Hg.

The porous membrane in an assembly wherein a condensing means is provided, is a hydrophobic microporous membrane, made from a material such as polypropylene, polyethylene, polytrimethylpentene, polytetrafluoroethylene, polyvinylidene difluoride or polysulfone. Preferably, the hydrophobic microporous membrane is made of polypropylene with pores having a size in the range of about 6 to about 500 Å.

Also in this assembly further comprising a condensing means, the nonporous membrane is made from rubbery nonporous material, such as polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, or polyethers. Preferably, the nonporous membrane is an ultrathin layer of plasma polymerized nonporous silicone.

Hence, yet still another embodiment of the present invention is an assembly for selectively separating a component from a multicomponent aqueous solution, comprising a feed chamber having a pressure, and for holding and introducing the multicomponent aqueous solution to be treated therein, an exit chamber having a pressure, and located adjacent to the feed chamber and downstream thereof, at least one membrane composite located between the feed chamber and the exit chamber and adapted for fluid registry therewith, the membrane composite is comprised of a microporous polypropylene membrane having a first and second surface with pores having a size in the range of about 6 to about 500 Å, and an ultrathin plasma polymerized nonporous silicone membrane permanently disposed on the second surface of the microporous polypropylene membrane, and having a permeability selective to the component or components removed from the multicomponent aqueous solution. A shell surrounds the membrane composite, and the microporous polypropylene membrane is at least one hollow fiber having a bore, an inner surface, and an outer surface, such that the inner surface corresponds to the first surface of the microporous polypropylene membrane, the outer surface corresponds to the second surface of the microporous polypropylene membrane, the bore corresponds to the feed chamber, and the exit chamber surrounds the hollow fiber and is defined by the shell surrounding the hollow fiber and the ultrathin plasma polymerized nonporous silicone membrane permanently disposed on the outer surface of the hollow fiber. An evacuation means is connected to the exit chamber for evacuating the component from the exit chamber, and a condensing means connected to the exit chamber the evacuations means for condensing the component separated from the multicomponent aqueous solution. The shell can also have a bottom exit, whose use is described below.

The membrane composite is aligned such that the ultrathin plasma polymerized nonporous silicone membrane is connected to the exit chamber and the first surface of the microporous polypropylene membrane is connected to the feed chamber. An oil-less vacuum pump for evacuating the component or components selectively removed from the multicomponent aqueous solution that permeate into the exit chamber, is connected to the exit chamber so that the pressure in the exit chamber is about $-27$ to about $-29.0$ or more inch Hg and the pressure in the feed chamber is approximately 7 to approximately 30 psig.

The component which this assembly selectively removes from a multicomponent aqueous solution is a volatile organic compound, or a high boiling point oil, or both.

If a high boiling point oil is to be separated, it is preferred the membrane composite in the assembly is at an angle to the horizontal. In this way, high boiling point oils which permeate through the membrane composite to the exit chamber can drop vertically and be removed from the exit chamber at the bottom exit of the shell. Hence, a buildup of the high boiling point oil on the nonporous side of the membrane composite, which can decrease the efficiency of the pervaporation process, is avoided.

The Hollow Fiber Membrane Composite Module

Also disclosed herein is a hollow fiber membrane composite module for selectively removing a component from a multicomponent aqueous solution, the module comprising at least one hollow fiber membrane composite having a bore, an inner surface, and an outer surface. The hollow fiber membrane composite is comprised of a porous hollow fiber membrane having a porous inner surface and a porous outer surface and a nonporous membrane permanently disposed on the porous outer surface, the nonporous membrane having a permeability selective to the component. There is also a feed chamber having a pressure, and defined by the bore of the at least one hollow fiber membrane composite. The module also has a shell that surrounds the at least one hollow fiber membrane composite, and an exit chamber that has a pressure, and surrounds the at least one hollow fiber membrane composite, which is defined by the shell and the nonporous membrane of the at least one hollow fiber membrane composite.

The porous membrane of the at least one hollow fiber membrane composite is a hydrophobic microporous hollow fiber membrane, which is made of a material such as polypropylene, polyethylene, polytrimethylpentene, polytetrafluoroethylene, polyvinylidene difluoride or polysulfone. Preferably, the hydrophobic microporous hollow fiber membrane is made of polypropylene, wherein its pores have a size in the range of about 6 to about 500 Å.

In this module, the nonporous membrane of the at least one hollow fiber membrane composite is made of a rubbery nonporous material, such as polydimethylsiloxane (silicone rubber), nitrile rubber, neoprene rubber, silicone-polycarbonate copolymers, fluoroelastomers, polyurethane, polyvinyl chloride, polybutadiene, polyolefin elastomers, polyesters, or polyethers. Preferably, the nonporous membrane is an ultrathin layer of plasma polymerized nonporous silicone.

One embodiment of the hollow fiber membrane composite module has at least 75 hollow fiber membrane composites surrounded by the shell.

Another embodiment of the hollow fiber membrane composite module has at least 10,000 hollow fiber membrane composites, and the shell has a diameter of at least two inches.

Also, it is important to note that all embodiments of the present invention can selectively remove a component from a multicomponent aqueous solution, regardless of whether surfactants are present in the multicomponent aqueous solution. However, if surfactants are used in the multicomponent aqueous solution, the pores of the first side of the porous membrane are likely to be wetted. As a result, nonpolar contaminants like VOCs and high boiling point oils will be selectively absorbed on the nonporous membrane, and ultimately provide a liquid membrane on top of the nonporous membrane to reduce water flux.

As used herein, the term "permanently disposed" as applied to the deposition of the nonporous membrane to the porous membrane means that the nonporous membrane is sufficiently bonded to the porous membrane such that a vacuum produced in the exit chamber, which is connected to the nonporous membrane, can not remove the nonporous membrane from the porous membrane.

The term "volatile organic compound" refers to an organic compound whose vapor pressure is less than standard atmospheric pressure. Specific examples of volatile organic compounds include toluene, xylene, acetone, trichloroethylene, trichloroethane, methanol, ethanol, methyl ethyl ketone, carbon tetrachloride, vinyl chloride, isobutanol, chlorobenzene, butane, pentane, hexane, octane, fluorinated hydrocarbons (CFC-11, CFC-12, CFC-113, CFC-114, CFC-115, etc.), HCFC ($C_2HCl_2F_3$), perchloroethylene, to mention but a few. Those skilled in the art will recognize the above list of examples is not exhaustive.

The term "high boiling point oil" refers to an oil whose boiling point is greater than the boiling point of water, and more specifically, much greater than the boiling point of water.

The term "porous membrane" or "microporous membrane" refers to a hydrophobic or a hydrophilic, or hydrophobic on one side and hydrophilic on the other side material containing pores having a diameter between about 6 and about 500 Å. Preferably, the membrane is provided in the form of a hollow fiber.

The term "ultrathin" when referring to the thickness of a permeable plasma polymerized nonporous silicone skin on the outside surface of the porous membrane means approximately 0.1 $\mu$m to 1 $\mu$m; preferably about 1 $\mu$m. This ultrathin nonporous skin is a significant barrier to permeation for such gases as air, nitrogen, carbon dioxide, etc. The skin developed by plasma polymerization on the microporous substrate develops an integral bonding with the substrate.

The term "hydrophobic" describes a substance which neither absorbs nor adsorbs water. Preferred hydrophobic membranes include porous polyethylene, porous polypropylene, porous polyamides, porous polyimides, porous polyetherketones, porous polyvinylidene fluoride, porous polyvinyl chloride, porous polysulfone, porous polyethersulfone, and porous polytetrafluoroethylene (PTFE). In a specific embodiment, the hydrophobic membrane is a porous polypropylene membrane, "CELGARD" (Hoechst Celanese, SPD, Charlotte, N.C.). These membranes may be isotropic (like "CELGARD"), or they may be asymmetric, as in ultrafiltration membranes. In an embodiment of the invention, the hydrophobic membranes may be "CELGARD" X-10 and "CELGARD" X-20. Those skilled in the art will recognize that the above list of examples is not exhaustive.

The term "hydrophilic" describes a substance that readily associates with water. Preferred hydrophilic membranes include porous regenerated cellulose, porous cellulose acetate, porous cellulose acetate-nitrate, porous cellulose triacetate, microporous glass, porous porcelain, and polyacrylonitrile, to mention a few. Those skilled in the art will recognize that the above list of examples is not exhaustive.

The term "rubbery material" refers to any polymer heated above its glass transition temperature.

The term "at an angle to the horizontal" describes the position of the hollow fiber membrane composite in that one of its ends is higher relative to the other end. Hence, the hollow fiber membrane composite is not in a horizontal position. Rather, it is at an angle to the horizontal so that high boiling point oils that permeate through the membrane composite to the exit chamber can drop from the membrane composite to the bottom of the exit chamber.

It is important to note that the examples of the present invention described below are merely exemplary, and should not be construed as limiting the present invention in any way. Moreover, any references cited below are not deemed to be prior art of the present invention.

EXAMPLE I

Removal of Trichloroethylene (TCE) from a Multicomponent Aqueous Solution Containing no Surfactant The multicomponent aqueous solution of this example did not contain a surfactant, hence the porous membrane of the membrane composite will likely not be wetted, and air will be trapped in the pores of the porous membrane.

As stated above, FIG. 1 is a schematical view of the solute concentration profiles in the multicomponent aqueous solution, the gas (air) filled pore of the hydrophobic microporous membrane, the ultrathin plasma polymerized nonporous silicone membrane permanently disposed on the outer surface of the hollow fiber membrane composite, and the exit chamber. There are three phase interfaces (aqueous—pore gas; pore gas—silicone membrane; silicone membrane—vacuum side) and four resistances (tube-side aqueous boundary; gas filled pore; silicone membrane; vacuum-side boundary layer). A mathematical formula for the overall mass transfer coefficient for the present invention has been derived as follows:

$$\frac{1}{K_0} = \frac{d_0}{d_i} \frac{1}{K_0} + \frac{H_i}{m_{vf} k_m} \quad (1)$$

Since the mass transfer behavior in laminar flow through the fiber bore is relatively well defined, experimental measurement of the solute vapor permeation transfer coefficient through the nonporous silicone coating ought to allow us to calculate the value of $K_0$ which may then be compared with experimentally obtained $K_0$. The experimental strategy therefore includes separate determination of the vapor permeation-based removal of TCE from $N_2$ through the silicone membrane when both sides have gaseous phases and no liquid phase. It must be noted here that the value of $k_i^f$ the overall mass transfer coefficient here corresponds to a somewhat variable boundary condition, namely, the TCE concentration at the silicone membrane coating changes along the fiber length. The solutions that are available for tube-side laminar flow mass transfer with developing concentration boundary layer correspond to constant wall flux or constant wall concentration (Skelland, A.H.P. Diffusional Mass Transfer, Wiley, New York, 1974, pp 158–160); the corresponding limiting values of the Sherwood number at very low Graetz numbers are 4.36 and 3.56 respectively.

This will introduce some uncertainty in the estimates of $k_i^f$ the liquid phase mass transfer coefficient to be used in Eq. (1) to calculate $K_0$.

The expression for Sherwood number for laminar fully developed velocity profile in a tube of length 1 with constant wall concentration is given by the expression (Skelland, supra):

$$(Sh|)_{lm} = \frac{k_i^f d_i}{D_{il}} = \frac{1}{4}\left(\frac{d_i}{l}\right) ReSc \ln\left[\sum_{j=1}^{j=0} \frac{-4B_j}{\beta_j^2}\left(\frac{d\phi_j}{dr_+}\right)_{r_+=1} \exp\left(\frac{-\beta_j^2(x/r_i)}{ReSc}\right)\right]^{-1} \quad (2)$$

Note that this is based on the logarithmic-mean concentration difference over the whole tube. The liquid phase mass transfer coefficient is calculated from Eq. (2) for substitution into Eq. (1).

Experimental

The following chemicals and gases were used for testing purposes: trichloroethylene (purity 99.9%, FW 131.39. density 1.456 g/cc), acetonitrile (HPLC grade, purity 99.9%), methanol (purity 99.9%. FW 32.04), from Fischer Scientific (Springfield, N.J.); ultrapure nitrogen, helium, air and liquid carbon dioxide from Matheson (E. Rutherford, N.J.).

The hollow fiber membrane modules contained hydrophobic microporous hollow fiber substrate (240 μm/290 μm ID/OD; polypropylene "CELGARD"X-10 Hoechst Celanese, Charlotte, N.C.) having a plasma polymerized thin nonporous silicone membrane on the outer surface. Three modules were prepared. The geometrical characteristics of these modules are given in Table 1.

TABLE 1

| | Characteristics of the modules used | | |
|---|---|---|---|
| Module No. | 1.* | 2.* | 3.* |
| Fiber Substrate | Celgard (X-10) | Celgard (X-10) | Celgard (X-10) |
| Membrane Coating | Silicone** | Silicone** | Silicone** |
| No. of Fibers | 75 | 75 | 75 |
| O.D. (μm) | 290 | 290 | 290 |
| Active Length (cm) | 20.5 | 20.5 | 28.5 |
| Mass Transfer Area Based on O.D. (cm²) | 140.1 | 140.1 | 194.7 |
| Remarks | Fabricated in lab | Fabricated in lab | Fabricated in lab |

Module No. 1 and 2 in series is identified as twins.
*Porosity ($\epsilon_m$) is 0.3 and tortuosity ($\tau_m$) is 3.5 [Prasad, R. and Sirkar, K. K., Dispersion Free Solvent Extraction with Microporous Hollow Fiber Modules AIChE J., 34:177 (1988)]
**Plasma polymerized by AMT Inc., Minnetonka, MN.

For each module, 75 fibers were used. Detailed fabrication procedure is provided in Chandra, S. *Removal of Volatile Organic Compounds from contaminated Groundwater by Pervaporation* M. S. Thesis, New Jersey Institute of Technology, Newark, N.J. 1996 (unpublished).

Experimental setup

FIG. 1 is a schematical view of the concentration profile of VOC in a hollow fiber membrane composite of the present invention for non-wetted membranes. The membrane composite 1 is comprised of a hydrophobic microporous membrane 2 having a first side 3 and a second side 4. An ultrathin plasma polymerized nonporous silicone membrane 5 is permanently disposed on the second side 4 of hydrophobic microporous membrane 2. The feed chamber 6 is connected to first side 3 of the hydrophobic microporous membrane 2. The exit chamber 7 is connected to the nonporous membrane 4.

Figure 2:
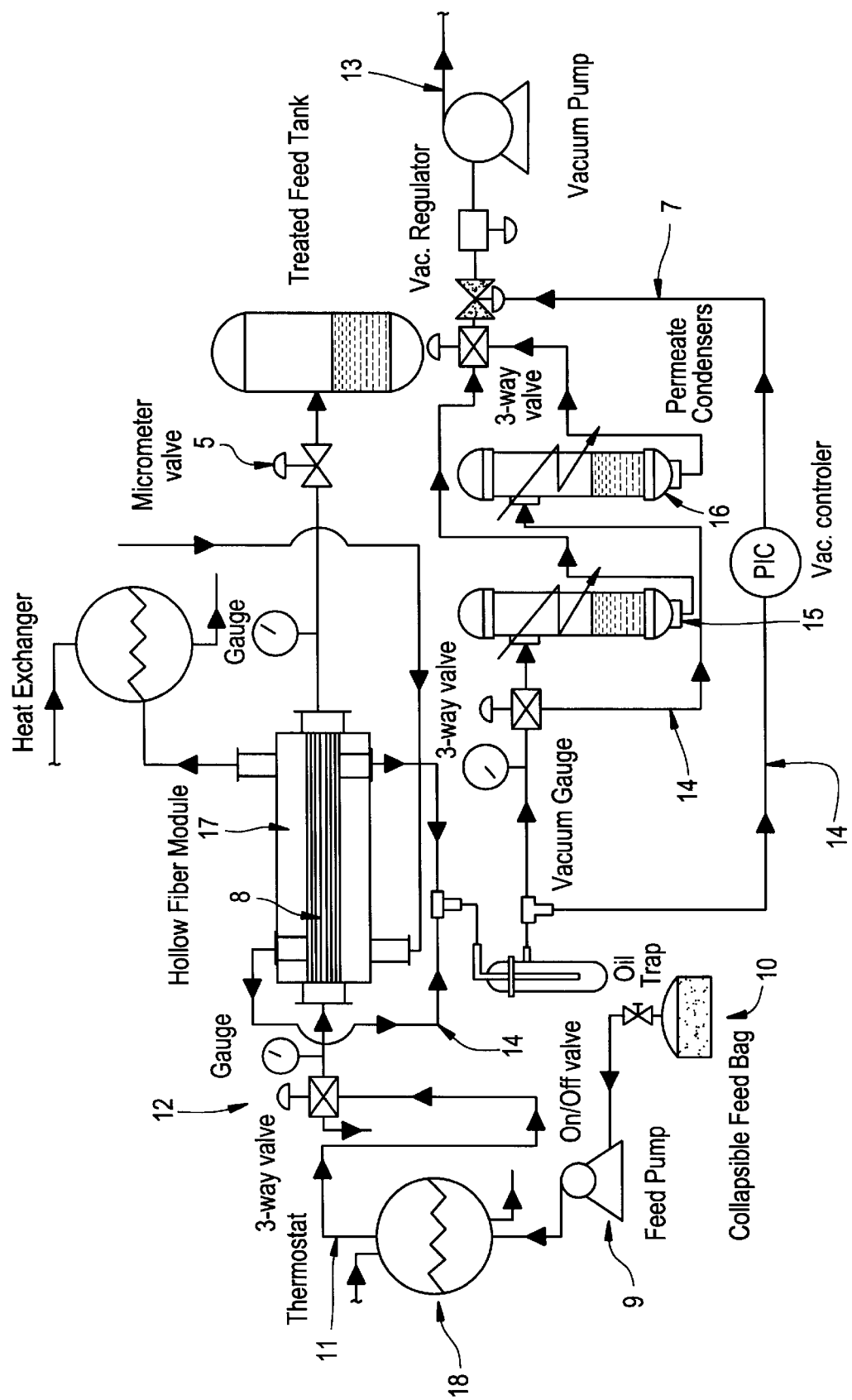
FIG. 2 is a schematical view of the assembly of the present invention.

The assembly for pervaporation of the present invention is shown schematically in FIG. 2. Feed was pumped into module 8 by a Peristaltic Masterflex pump 9, model 7518-10 (Cole Parmer, Vernon Hills, Ill.) from a collapsible Teflon bag 10 (Cole Parmer, Vernon Hills, Ill.). Teflon bags of two different sizes 1.2 L and 4.7 L were used depending on the flow rate and the duration of the experiment. Transparent ¼"I.D. Teflon tubing 11 (Cole Parmer, Vernon Hills, Ill.) and stainless steel fittings (Swagelok, R. S. Crum, New Brunswick, N.J.) were used for the feed and all connecting lines to and from the membrane module 8. The feed line was connected to a three way valve 12 (Swagelok, R. S. Crum, New Brunswick, N.J.) for collection of feed samples. A micrometer valve (not shown) (Swagelok, R. S. Crum, New Brunswick, N.J.) was connected to the feed line 11 to regulate the feed pressure. An oil-less vacuum pump 13 (KNF Neuberger, Trenton, N.J., Model UN 726.112 FTP) was used to maintain a vacuum of −28.5/−29.0 inch Hg. Convoluted Teflon tubes 14 (Cole Parmer, Vernon Hills, Ill.) were used for vacuum line connections to the condensers. The module 8 was immersed in a polyethylene water bath 17 interfaced to a thermostat 18 (Fisher Scientific, Springfield, N.J.) to maintain the desired temperature range between 18° to 50° C. All experiments for part I of the series were run at 25° C. Two condensers 15 and 16 (Labglass, Vineland, N.J.)

with a graduated tip were connected in series to the vacuum line 14 before the vacuum pump 13. Vacuum controller 25 permits control of the vacuum drawn through line 14. Furthermore vacuum regulator 28 permits the maintenance of the vacuum formed by vacuum pump 13 in the assembly. Dry ice and methanol were used as cooling medium in a Dewar flask (Labglass, Vineland. N.J.), inside which each condenser was kept to trap the permeate vapor from the module outlet. Treated feed tank 20 is in fluid communication with the feed chamber located in module 8, and collects feed that has passed through the feed chamber. Also, micrometer valve 19 is located between the feed chamber and treated feed tank 20, and in fluid communication with the feed chamber and tank 20. Valve 19 permits one to control the rate in which feed enters treated feed tank 20. Furthermore, gauges 21 and 22 respectively allow the monitoring of the pressure of feed prior to entering, and after passing through the feed chamber. Thermostat 23 allows the monitoring and controlling of the temperature of feed entering the feed chamber. Optionally, the assembly of the invention can comprise oil trap 24, located downstream from the exit chamber, upstream from condensers 15 and 16, and is in fluid communication with the exit chamber and condensers 15 and 16. Oil trap 24 traps any nonvolatile oils which pass into the exit chamber so that potential clogging of line 14 or condensers 15 and 16 is avoided. Furthermore, 3-way valve 26 is in fluid communication with oil trap 24, condenser 15, and condenser 16. A second 3-way valve 27, located downstream from condensers 15 and 16, is in fluid communication with condenser 15, condenser 16 and vacuum regulator 28.

Analytical procedure

Aqueous TCE concentration was measured in a HP 6890 series gas chromatograph (GC) using a HP 7694 Headspace Sampler and HP 6890 series integrator ( Hewlett Packard, Wilmington, Del.). TCE was analyzed by a flame ionization detector (FID) using a HP-5 capillary column (crosslinked 5% PH ME Siloxane) of 30 m length, 320 $\mu$m diameter and 1 $\mu$m film thickness (Hewlett Packard, Wilmington, Del.). Ultrapure nitrogen was used as the carrier gas. The methodology of Full Evaporation Technique (FET) was used (Markelov, M. and Guzowski, J. P. *Matrix independent headspace gas chromatographic analysis. The full Evaporation Technique.* Analytica. Chimica. Acta. 15 (1993), 234–2450). This technique was based on a near complete transfer of analytes from a condensed matrix into a vapor phase. Reproducible results were obtained by using 13 $\mu$L of sample in 22.5 mL headspace vial. The optimum headspace oven temperature (100° C.), sample volume (13 $\mu$L) and sample equilibration time (5 minutes) were determined after an extensive study by varying each of these parameters one at a time. Sample vials were thermostated in the headspace analyzer for 5 minutes at 100° C. Headspace vapors were analyzed by pressurizing the vials for 0.15 minutes followed by a timed injection of the vapors for 1 minute into the GC column. A temperature program was fixed to get clear separation of TCE. The initial oven temperature was set at 40° C. for 1.5 minutes. In the next step, temperature was ramped at 25° C./minute until it reached 75° C. where it was kept for 1 minute. In the final step, the temperature was ramped at 40° C./minute until 160° C. which was maintained for 3 minutes.

Experimental procedure

Fresh feed for pervaporation experiment was prepared before each experiment to avoid volatilization of TCE. The feed was prepared in a glass vessel with a minimum of headspace to avoid volatilization of TCE. Feed solution was pumped into the collapsible Teflon bag 10 which prevented formation of headspace during an experimental run and kept the feed concentration nearly constant. Feed was kept at a pressure range of 7–10 psig by using a micrometering flow control valve (Swagelok, R. S. Crum, New Brunswick, N.J.) in the retentate line. Feed pressure was monitored by using a dial pressure gauge (Cole Parmer, Vernon Hills. Ill.). Dewar flasks were filled with dry ice and methanol after putting in condensers 15 and 16 to achieve a low cooling temperature (approx. −50° C.). Condensers 15 and 16 and the feed lines were insulated with glasswool and aluminum foil. Samples were taken every half-hour and analyzed. The experiment generally reached steady state after 3 hours and normal runs were carried out for 6–7 hours. The experiment was stopped once consistent results were obtained from 4 consecutive samples. The volume of the permeate was observed and noted from the collection in the condenser. The volume of water and the TCE could be easily noted as the permeate separated into two distinct organic and aqueous phases. After every experiment the module was washed for a few hours with deionized water and filtered nitrogen was passed overnight to dry it before another experiment.

Sampling of feed and retentate in pervaporation experiments was done carefully to avoid any loss. The feed line was connected to a three-way valve for collection of feed sample. At the time of feed sample collection, the three-way valve 12 was opened and the feed was allowed to flow for a minute to avoid any error arising from any stagnant feed in the collection line. Samples were collected in a small 2 mL glass vial and capped immediately with a Teflon-lined cap to avoid TCE loss. For analysis in the GC/ Head space, 13 $\mu$L of the sample was taken in a high precision Hamilton microsyringe and was directly injected into a headspace vial of volume 22.5 mL. Same procedure was followed for the retentate sample for the GC.

The experimental procedure for vapor permeation experiments will be briefly described now. A standard mixture of TCE in $N_2$ in a cylinder (Matheson. E. Rutherford, N.J.) was passed through the tube side of module #1 at essentially atmospheric pressure. A vacuum was maintained on the permeate side (shell side) at −29.2 inch Hg. The permeate flow was countercurrent with one end closed and the feed-side end connected to the vacuum pump. The gas flow rates at the inlet and the outlet were measured by electronic mass flow meters (Matheson, E. Rutherford, N.J.). The composition of the gas stream at the feed outlet was measured in a Varian 3400 gas chromatograph (Varian Associates, Sugarland, Tex.) having a flame ionization detector; the column employed was a 0.3% Carbowax 20M, Carbopack C, Mesh 80/100, 0.85" ID, 0.1625" OD.

Calculated Quantities

The fluxes of TCE and water were obtained respectively from the volumes of the TCE phase and water phase collected over time t from the membrane of area $A_m$:

$$J_i = \frac{V_{TCE} P_{TCE}}{A_m t} \qquad (3)$$

$$J_w = \frac{V_{H_2O} P_{H_2O}}{A_m t} \qquad (4)$$

where $J_i$ and $J_w$ are TCE flux and water flux respectively. Here $A_m$ is defined as:

$$A_m = \pi d_0 N l \qquad (5)$$

where N is the number of hollow fibers of outside diameter $d_0$, and length l. The Reynolds number for flow inside the fiber is defined by $$Re = \frac{d_i \rho_{H_2O}}{\mu_{H_2O}} \quad (6)$$

where the velocity of the solution v is obtained from $$v = \frac{4Q}{60N\pi d_i^2} \quad (7)$$

for a volumetric flow rate of Q cc/min. The overall mass transfer coefficient $K_0$ for TCE is obtained from $$J_i = K_0 \Delta C_{lm} \quad (8)$$

where $\Delta C_{lm}$ is obtained from $$\Delta C_{lm} = \frac{(C_{inlet} - C^p_{inlet}) - (C_{outlet} - C^p_{outlet})}{\ln\left[\frac{(C_{inlet} - C^p_{inlet})}{(C_{outlet} - C^p_{outlet})}\right]} \quad (9)$$

For purposes of analysis, it was assumed that $C^p_{inlet}$ as well $C^p_{inlet}$ as may be neglected in comparison to $C_{inlet}$ and $C_{outlet}$ respectively. The Sherwood number is defined as $$Sh = \frac{K_0 d_0}{D_{il}} \quad (10)$$

where $D_{il}$ is the diffusivity of TCE in water. Percent removal of TCE is defined as $$\% \text{ removal} = \frac{C_{inlet} - C_{outlet}}{C_{inlet}} \times 100 \quad (11)$$

Results and Discussion

Figure 3:
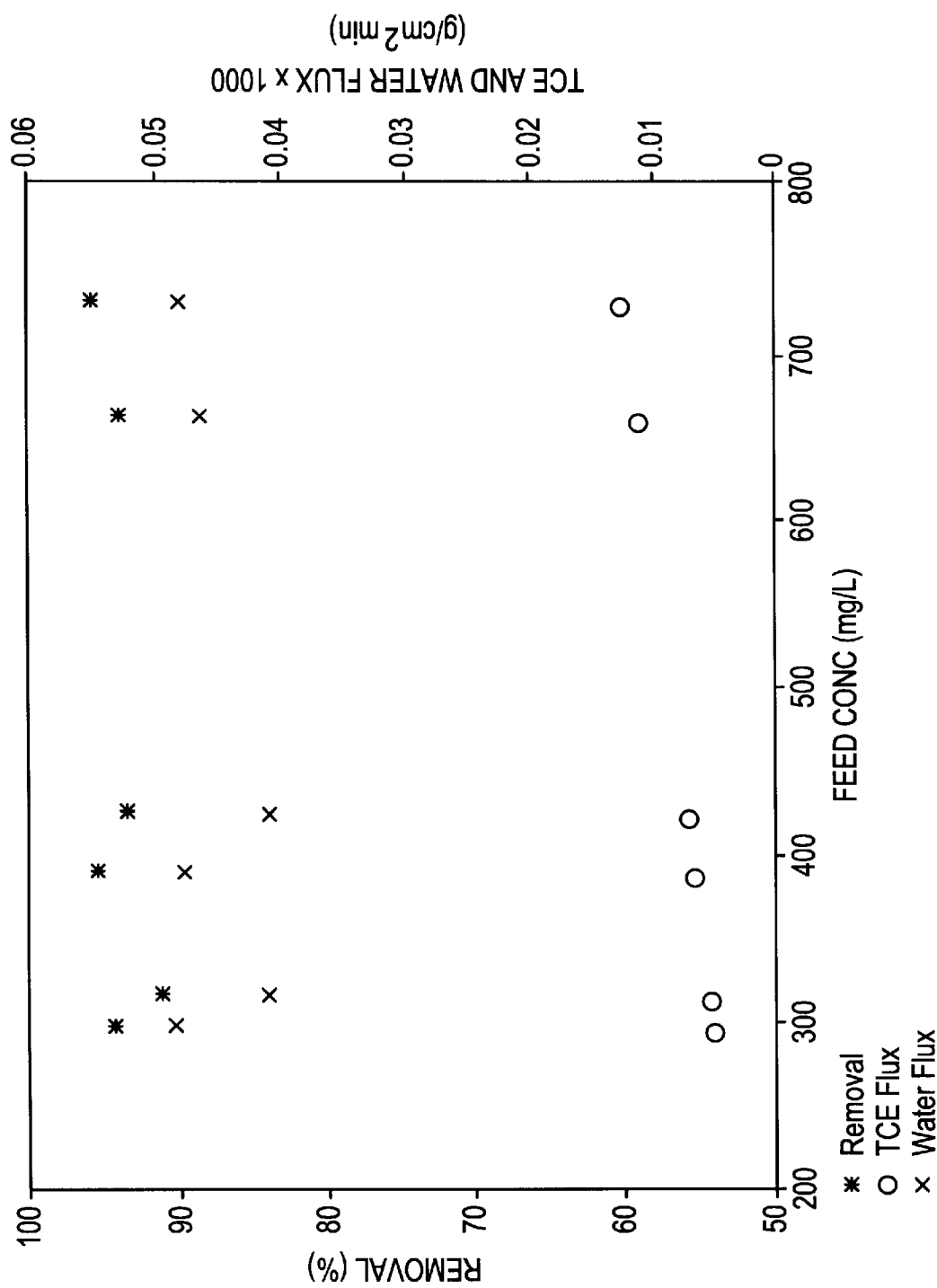
FIG. 3 shows a variation of the percentage of TCE removed with the present invention from multicomponent aqueous solutions with increasing TCE concentration with non-wetted pore conditions.

The performance of a hollow fiber module (module #1) at 25° C. as the feed TCE concentration was evaluated at a low feed flow rate of 2.5 mL/min. FIG. 3 shows that % TCE removal is reasonably constant with increasing TCE concentration. The TCE flux appears to be linear with the TCE concentration in the feed.

Figure 4:
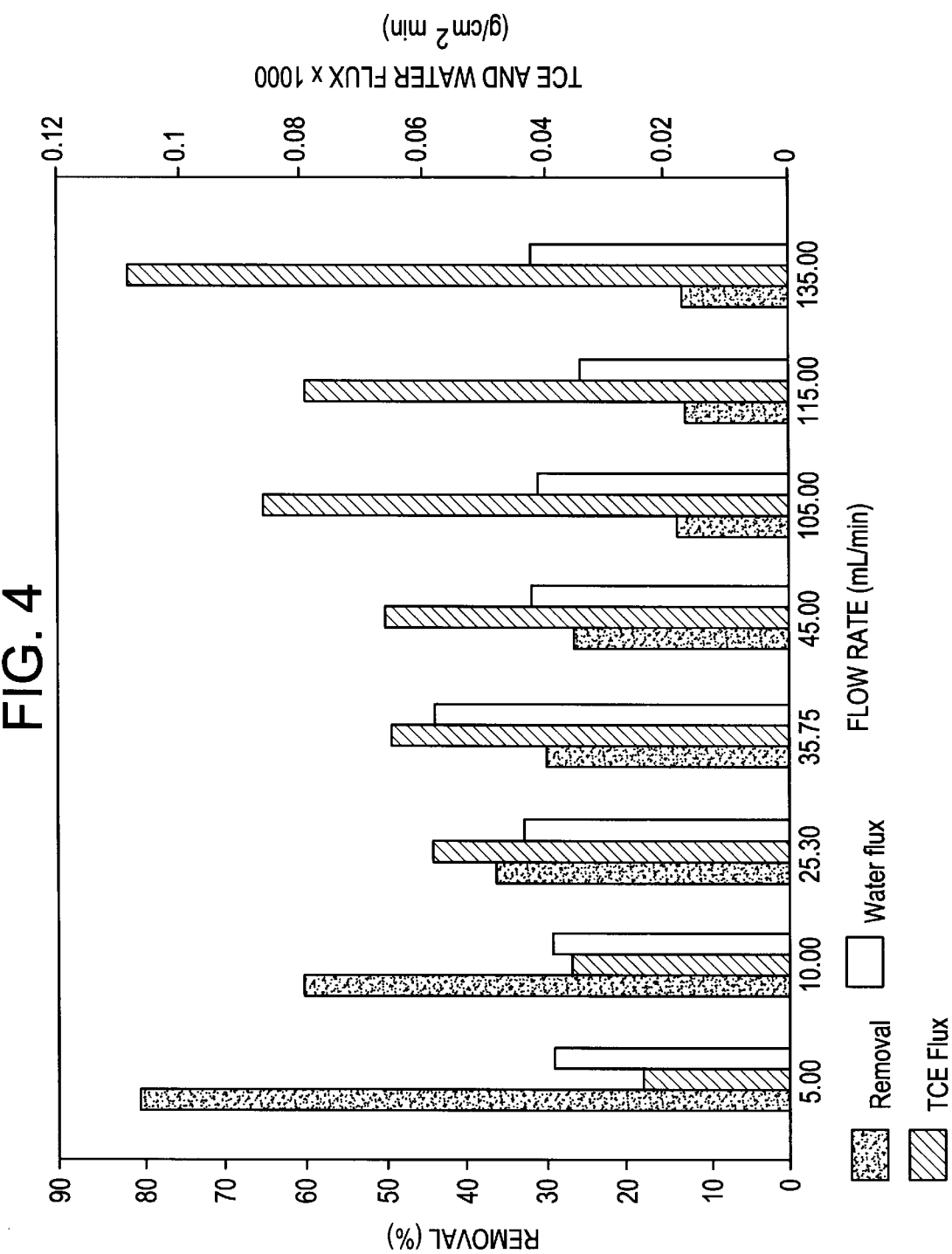
FIG. 4 shows the effect of feed flow rate on TCE removal, TCE flux and water flux with the present invention with non-wetted pore conditions.

FIG. 4 illustrates the TCE removal behavior for feed TCE concentrations in the range 800–900 ppm at a number of high flow rates. Due to the limited amount of membrane area in module #1, the extent of removal of TCE is drastically reduced as the feed flow rate is increased. For example, the percent TCE removal drops from 80% at 5 mL/min to about 13% at 105 mL/min. This leads to a much higher TCE concentration throughout the module and correspondingly the TCE flux appears to increase almost linearly with the feed flow rate. The water flux should be unaffected by the feed flow rate, which the experimental results confirm.

Figure 5:
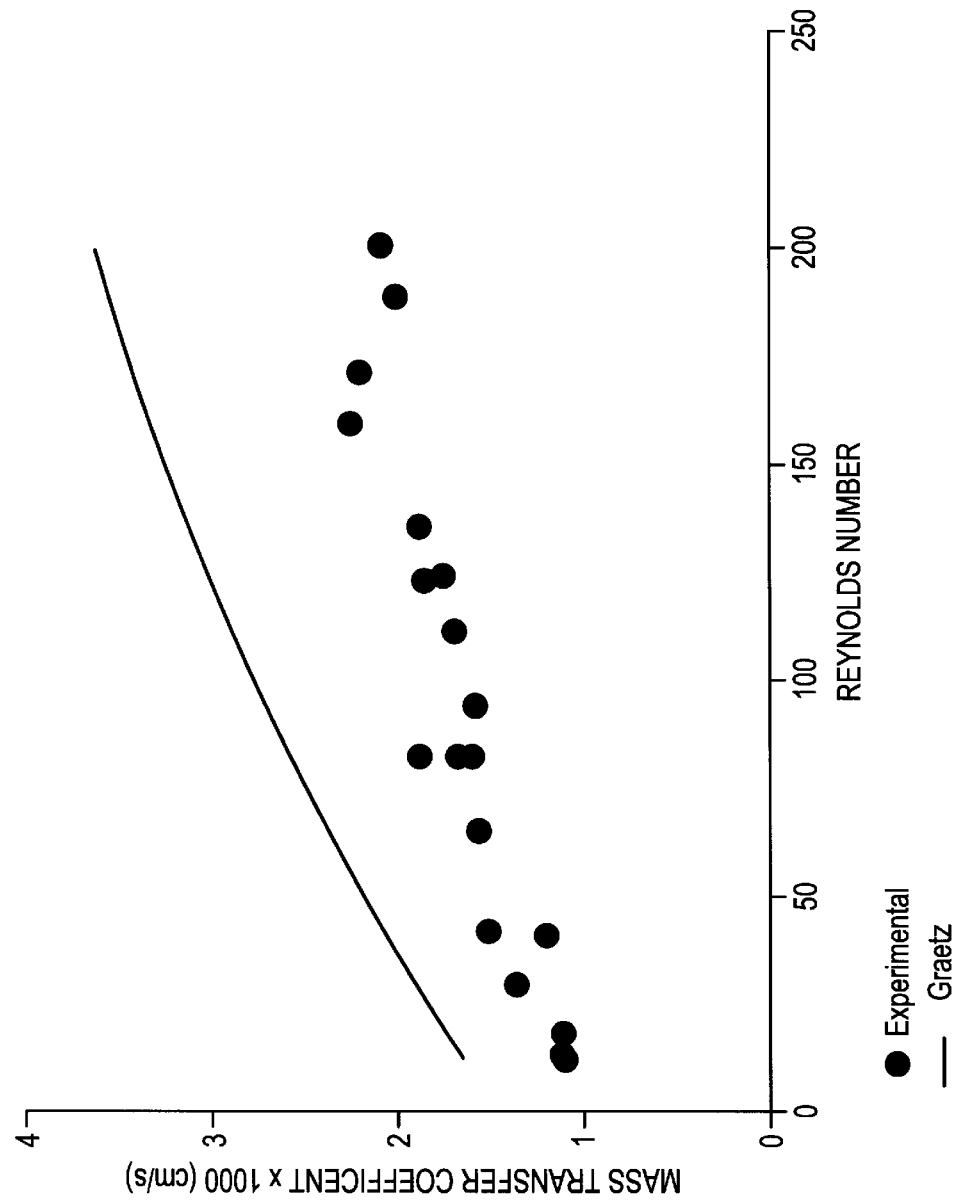
FIG. 5 shows the effect of hydrodynamics on TCE overall mass transfer coefficient with non-wetted pore conditions.

The mass transfer coefficient of TCE based on definition (8) and the logarithmic concentration difference (9) has been plotted in FIG. 5 as a function of the fiber bore Reynolds number. In the same figure, the mass transfer coefficient is plotted according to the Graetz equation.

$$(Sh)_{lm} = \quad (2)$$

$$\frac{k_i^f d_i}{D_{il}} = \frac{1}{4}\left(\frac{d_i}{l}\right) ReSc \ln\left[\sum_{j=1}^{j=0} \frac{-4B_j}{\beta_j^2}\left(\frac{d\phi_j}{dr_+}\right)_{r_+=1} \exp\left(\frac{-\beta_j^2(x/r_t)}{ReSc}\right)\right]^{-1}$$

The data were obtained from module #1 at 25° C. in the TCE concentration range of 700–900 ppm; the data shown in FIG. 4 along with others not shown were utilized to obtain this plot. It is clear that the observed total resistance is significantly larger than that due to the feed solution boundary layer resistance in the fiber bore, as would be suggested by Equation (1) to be due to the ultrathin plasma polymerized nonporous silicone membrane resistance.

Figure 6:
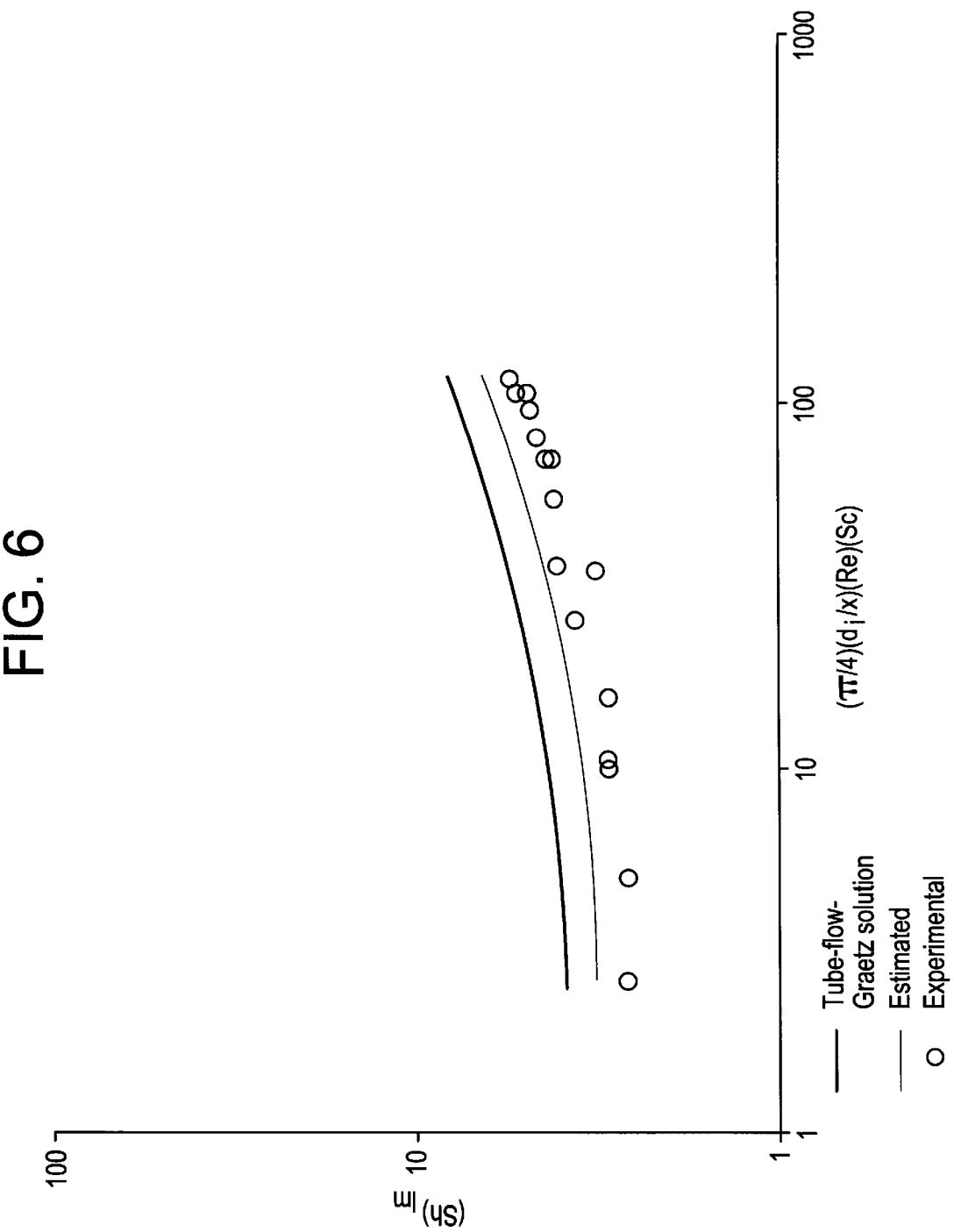
FIG. 6 shows a comparison of TCE mass transfer coefficient obtained with the present invention to model-estimated values of the TCE mass transfer coefficient with non-wetted pore conditions.

FIG. 6 shows a plot of the overall mass transfer coefficient data of TCE obtained using $\Delta C_{lm}$ of Eq. (9) as the Sherwood number $(N_{Sh})_{lm}$ against the Graetz number. The Sherwood number for Graetz solution corresponding to constant wall concentration (Skelland, A.H.P. *Diffusional Mass Transfer* Wiley, New York, 1074, pp 158–160) is also plotted in the same figure as a solid line for $(N_{Sh})_{lm}$ versus Graetz number. The difference between the two appears to be rather constant, independent of the Graetz number. The difference reflects the ultrathin plasma polymerized nonporous silicone membrane resistance, as discussed below.

Table 2 displays experimental data and calculated quantities (see infra for details) for the vapor permeation experiments of with TCE in $N_2$ for a number of feed TCE concentrations (220–935 ppm).

TABLE 2

Results of vapor permeation experiments and simulations with TCB in $N_2$

| Module | Flow Rate cm³/min | | Concentration ppmv | | Simulated TCE Concentration Mole fraction | | $\Delta C_{lm}$ gmol/cc | TCE Flux gmol/ cm² · sec | $k_m m_{vf}$ |
|---|---|---|---|---|---|---|---|---|---|
| No. | Feed in | Feed out | Feed in | Feed out | Feed in | Feed out | (×10⁸) | (×10¹⁰) | cm/sec |
| 1 | 214.87 | 207.03 | 220 | 141 | 0.0022 | 0.0029 | 0.50 | 0.96 | 0.019 |
| 1 | 419.06 | 405.2 | 467 | 376 | 0.0061 | 0.0070 | 1.14 | 2.31 | 0.0201 |
| 1 | 306.35 | 297.76 | 631 | 467 | 0.0093 | 0.0110 | 1.29 | 2.89 | 0.0223 |
| 1 | 347.87 | 339.67 | 751 | 567 | 0.0075 | 0.0091 | 1.99 | 3.65 | 0.0183 |
| 1 | 352.90 | 346.24 | 867 | 656 | 0.0108 | 0.0127 | 2.06 | 4.20 | 0.0204 |
| 1 | 272.97 | 267.02 | 935 | 641 | 0.0106 | 0.0132 | 2.14 | 4.46 | 0.0209 |

It was observed that the value of $k_m m_{vf}$ in the vapor permeation equation for TCE flux, $J_i$, where $$J_i = k_m(C_{imi}' - C_{imi}'') = k_m m_{vf}(C_{igmi}' - C_{imp}'') \quad (12)$$

(where it was assumed $m_{vf}=m_{vp}$ which is quite reasonable for this dilute system) was 0.02 cm/sec. Since the value of Hi for TCE is 2.75 $(mg/L)_{liq}/(Mg/L)_{vap}$ (Turner, L. H., et al. Measuring vapor-liquid equilibrium for aqueous-organic systems: review and a new technique. AIChE J., 42 (1996) 6.), a value of 131.5 (sec/cm) for $(H/m_{vf}k_m)$ in Eq. (1) was obtained. Using this estimate in Eq. (1) and the value of from the $(Sh)_{lm}$ versus Graetz number valid for Graetz solution (2) for tube flow, a dotted line has been plotted for the estimated value of $K_O$, the overall mass-transfer coefficient, in FIG. 6. The difference between the estimated $K_O$, in and the experimentally-obtained $K_O$ in FIG. 6 is minor. This agreement, then can provide a fundamental basis for determining the values of $K_O$ in the present invention for removing VOC from an aqueous solution through the hydrophobic microporous membrane side of the coated hollow fiber.

The method by which the permeance of TCE has been determined from the vapor permeation experiments is based on detailed experimental studies and numerical modeling as set forth in Cha, J. S. et al *Removal of VOCs from waste gas streams by permeation in a hollow fiber permeator* J. Membrane Sci., 128 (1997) 195, using similar hollow fiber membranes. Cha, et al (1997) had developed a set of equations to describe vapor permeation under identical physical conditions. The equations were solved numerically for a given expression of permeance of a VOC as a function of the VOC partial pressure on the feed side. It is known from these and other studies for at least four different VOCs (e.g. methanol, toluene, methlyene chloride, and acetone) that at VOC concentrations of 200–1000 ppmv, the permeance is essentially constant. For the set of experiments conducted for this study, TCE concentration in the feed ranged between 220–935 ppmv. The procedure follows was as follows. The TCE inlet concentration in the feed and the feed flow rate at the inlet were fed into the numerical model. A value of $k_m m_{vf}$ was calculated using $\Delta c_{lm}$ value for the gas phase for a given experiment by neglecting the partial pressure of TCE on the permeate side. This value was used as a starting point for the iteration. The numerical solution of the model provided as output the TCE outlet concentration in the feed, the feed flow rate at the outlet and the permeate side partial pressure profile of TCE. The TCE outlet concentration in the feed and the feed flow rate at the outlet were matched to experimental data; if the simulated results were found to be reasonably close to experimental results, the corresponding permeate side partial pressures were used in the $\Delta c_{lm}$ of Eq. (12) for the whole permeator to calculate the value of $k_m m_{vf}$. If the simulated results showed significant divergence from the experimental results, the procedure was repeated until satisfactory convergence was achieved.

Figure 7:
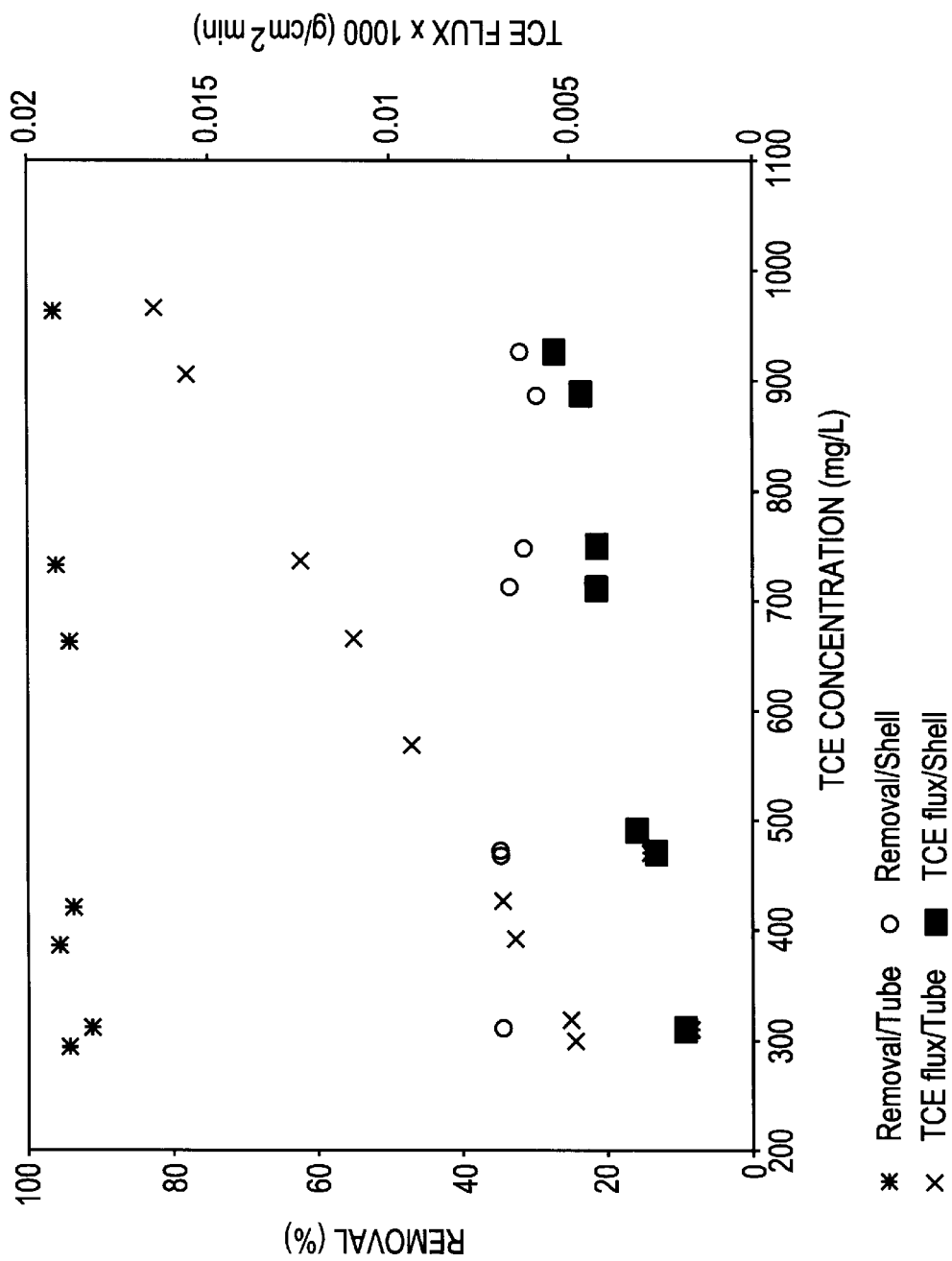
FIG. 7 shows the TCE removal and TCE flux with the present invention, and TCE removal and TCE flux with conventional pervaporation methods and assemblies with non-wetted pore conditions.
Figure 8:
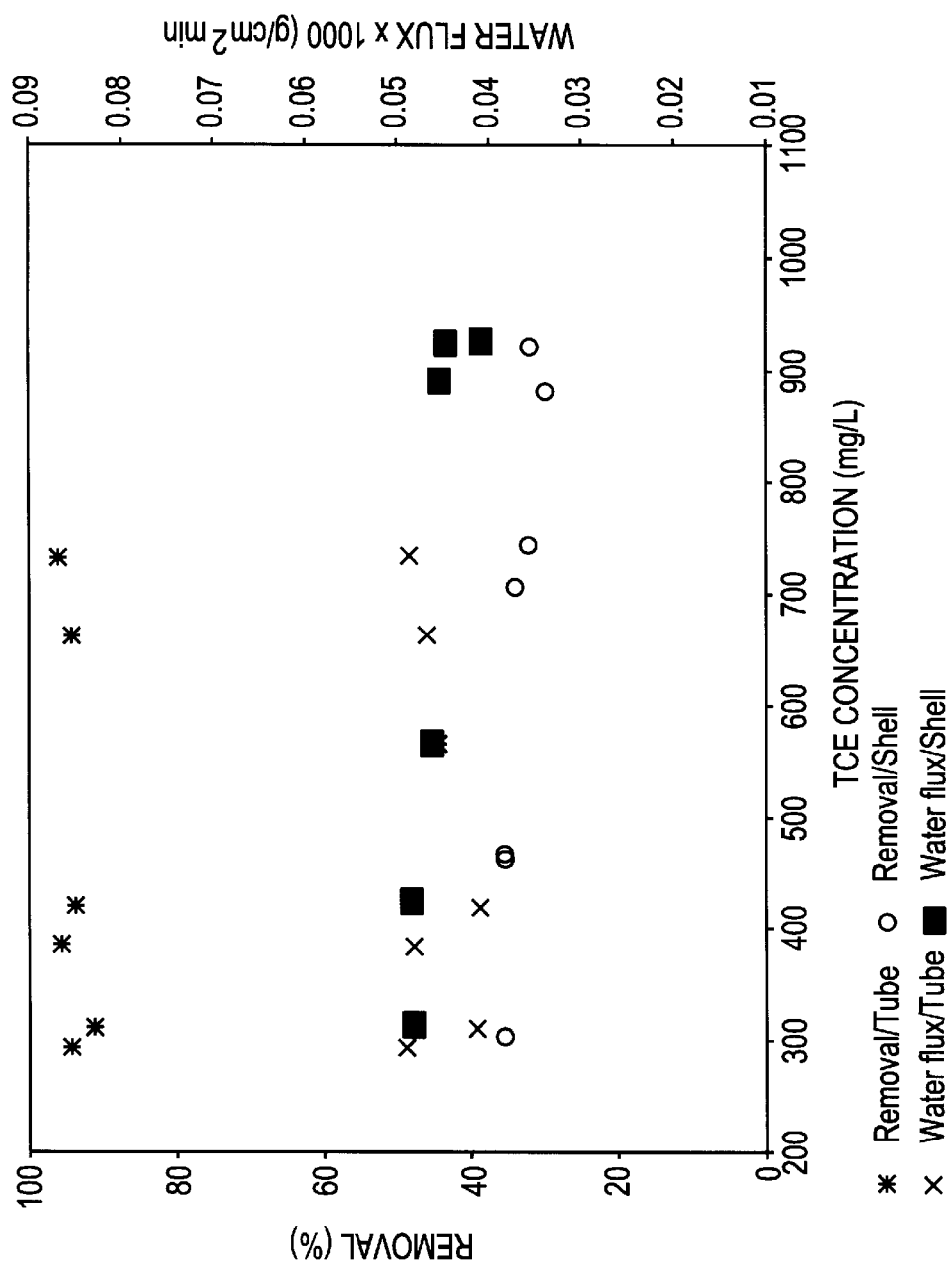
FIG. 8 shows the TCE removal and water flux with the present invention, and TCE removal and water flux with conventional pervaporation processes and assemblies with non-wetted pore conditions.

FIG. 7 presents experimental data for the removal and flux of TCE when the feed solution was passed on the shell side as per conventional pervaporation processes and assemblies, wherein the nonporous membrane is in direct contact with the feed liquid. The aqueous feed solution flow rate is the same as in FIG. 3, namely 2.5 mL/min. For the sake of comparison, the data from FIG. 3 are also plotted here. It appears that the TCE removal is substantially lower when the feed is on the shell side. In fact the percent removal of TCE for feed flow on the shell side is almost half of that for flow on the tube side as set forth in the present invention. FIG. 7 also shows the corresponding fluxes of TCE in the two flow configurations. The tube side flux of TCE is, as expected, considerably larger than that in the shell side. The values for water flux for flow in the tube side and shell side are shown in FIG. 8 and appear comparable to each other.

Thus, an embodiment of a pervaporation process and assembly according to the present invention for removing VOCs from a multicomponent aqueous solution has been described. The present process and apparatus, where feed solution was not directly contacted the nonporous membrane on the fiber outside diameter, was shown to be significantly more efficient than conventional pervaporation.

Example II

Removal of volatile organic compounds from multi- component aqueous solutions containing surfactants In this example, the multicomponent aqueous solution contained surfactants of various types and at various concentrations. These experiments were set up to determine the efficiency of the present invention with surfactants. All experiments were conducted such that the multicomponent aqueous solution contacted the first side of the porous membrane of the membrane composite.

EXPERIMENTAL

Materials used in this experiment included: trichloroethylene (purity 99.9%, FW 131.39, density 1.456 g/cc), isopropyl alcohol (HPLC grade) from Fisher Scientific (Springfield, N.J.), sodium dodecyl sulfate (SDS) (purity 99%, FW 288.4) and gum xanthan (practical grade) from Sigma (St. Louis, Mo.). Sodium dialkylated diphenyl disulfonate ("DOWFAX" 8390) was supplied by Dow Chemical Company, Mich.

Air, ultrapure nitrogen, high purity hydrogen and liquid carbon dioxide were obtained from Matheson (E. Rutherford, N.J.).

Hollow Fiber Membrane Modules

The hollow fiber modules contained a bundle of hollow fibers contained in a stainless steel tube used as the shell. The hollow fibers consisted of a microporous polypropylene having an inner and outer surface, and an ultrathin skin of plasma polymerized polydimethylsiloxane (PDMS) permanently disposed on the outer surface. The hollow fiber dimensions were: 240 $\mu m$/290 $\mu m$ inner diameter/outer diameter, (ID/OD); the polypropylene substrate was "CELGARD"X-10 (Hoechst Celanese, Charlotte, N.C.). A number of modules were used. For module #1, used most often, the OD-based mass transfer area (MTA) was 140.1 cm$^2$ and the number of fibers was 75. Another module (#2) had an MTA of 190.1 cm$^2$. (Chandra, S. *Removal of Volatile Organic Compounds from contaminated Groundwater by Pervaporation* M. S. Thesis, New Jersey Institute of Technology, Newark, N.J. 1996 (unpublished))

Experimental Setup and Procedure

The assembly used in this experiment is schematically shown in FIG. 2. The feed was pumped into the membrane module 8 by means of a peristaltic Masterflex pump 9 (7518-10 model) from a collapsible Teflon bag 10 (both from Cole Parmer, Vernon Hills, Ill.) to maintain a constant concentration of the VOCs and to avoid volatilization. Stainless steel tubing and fittings (Swagelok, R. S. Crum, New Brunswick, N.J.), and Teflon and Viton tubing (Cole Parmer, Vernon Hills, Ill.) were used in the setup. To maintain a differential pressure across the membrane, a vacuum was maintained on the other side of the membrane using an oil-less (KNF Neuberger, Trenton, N.J.) vacuum pump 13; the permeate pressure was regulated by a vacuum controller (not shown) (J-Kem Scientific, St. Louis, Mo.). The temperature of the module(s) 8 was maintained by immersing them in a bath 17 interfaced to a thermostat 18. Two condensers 15 and 16 were used to collect the permeate, one was used for the initial 3 hours non-steady state period and the second for the collection after the steady state was reached. The temperature of the condensers 15 and 16 was maintained at −40° C. using a mixture of dry ice and methanol.

Analytical Procedure

The concentration of VOCs used was measured in a HP 6890 series gas chromatograph using a HP 7694 Headspace Sampler and HP 6890 series integrator (Hewlett Packard, Wilmington, Del.). VOCs were analyzed by a flame ionization detector (FID) using a HP-5 capillary column (crosslinked 5% PH ME Siloxane) of 30 m length and 320 $\mu$m I.D. and 1 $\mu$m film thickness. The Full Evaporation Technique (Ibid) was applied throughout this study.

RESULTS AND DISCUSSION

Removal of TCE from a 0. 3% SDS Micellar Solution in a Single Module

The experiments were performed to study the process of pervaporation of VOCs with the present invention on a bench scale. Trichloroethylene (TCE) was chosen as the model contaminant. The experiments were carried out in module #1, whose properties are set forth in Table 1 of Example I above.

Figure 9:
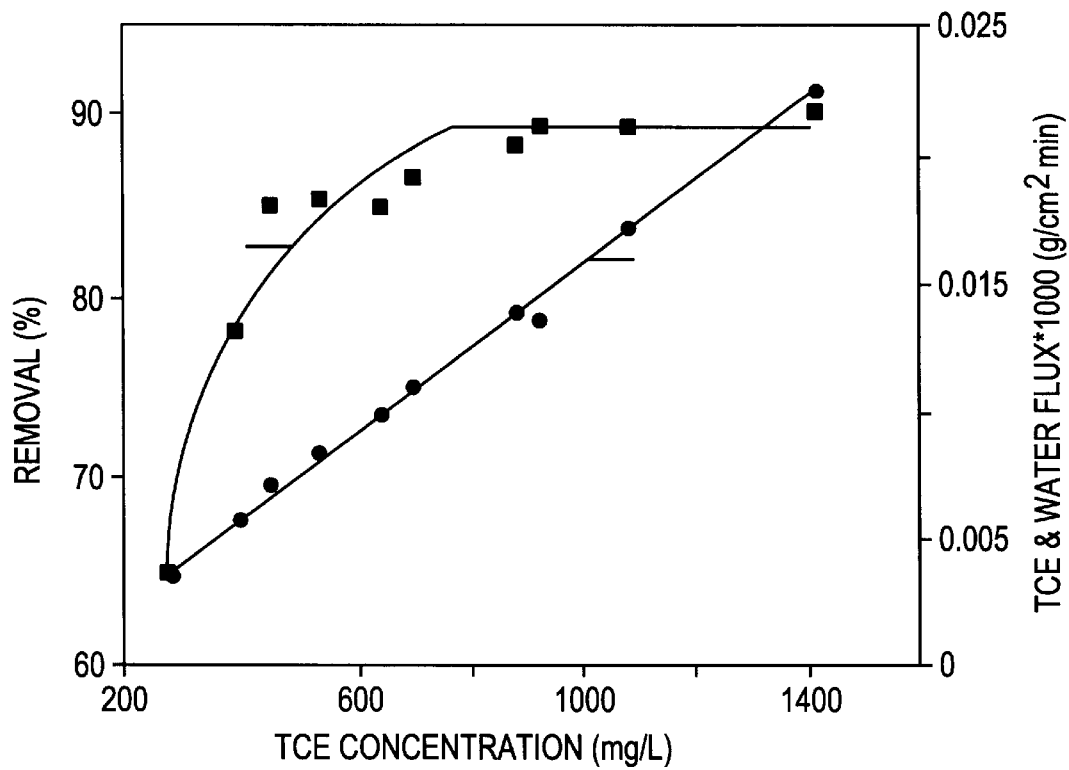
FIG. 9 shows the effect of TCE concentration on the percent removal of TCE and on the TCE and water flux with the present invention in a multicomponent aqueous solution containing a surfactant.

FIG. 9 shows the percent removal and the flux of TCE from a 0.3% SDS solution plotted against the TCE inlet concentration of TCE for a low flow rate. The operating conditions are indicated at the top of the figure. The experimental data show that the removal of TCE was increased when the initial concentration of TCE was increased; further, the removal became constant at 90% beyond a TCE concentration of 800 ppm. However, the flux of TCE increased linearly with concentration.

The Effect of Surfactants on TCE Removal. TCE Flux and Water Flux

Two surfactants were employed: SDS and "DOWFAX" 8390. The concentration of the surfactants were chosen so that the molar concentration of both were approximately equal. Obviously, the critical micellar concentration (cmc) of SDS (0.25% to 0.28%) is much higher than that for "DOWFAX", namely, 0.014. Hence, fewer micelles are formed by the former surfactant. The experiments were carried out at a feed flow rate of 2.5 mL/min. in module #1 and another identical module in series (MTA 280.2 cm$^2$).

Figure 10:
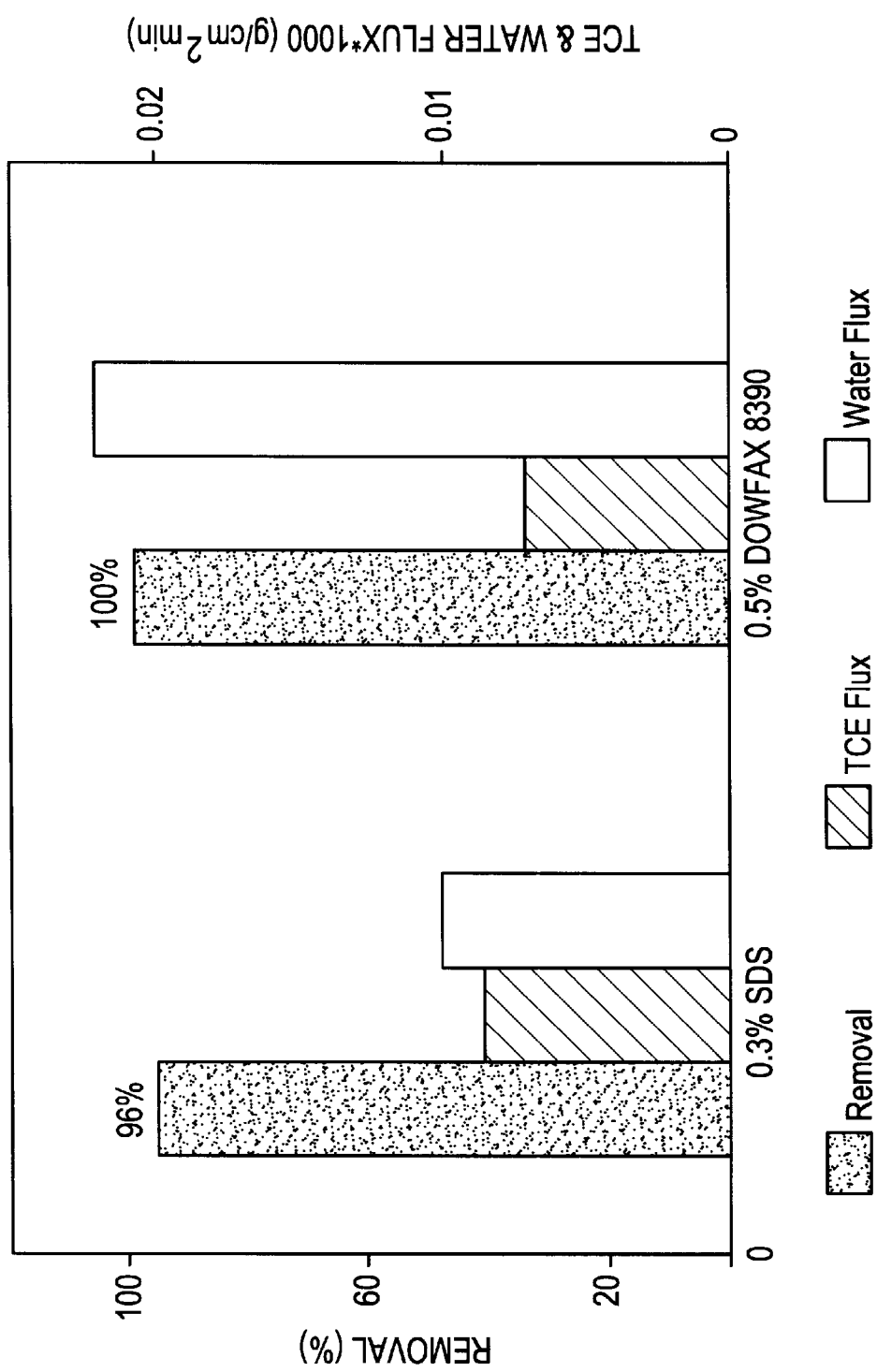
FIG. 10 shows the effect of different surfactants on the removal of TCE and TCE and water flux with the present invention.

FIG. 10 shows that the percent removal of TCE from the "DOWFAX" solution was higher (approximately 100%) than that from SDS solution ( approximately 96%). Consequently, this should have resulted in a higher TCE flux, which was not the case, although this may be explained by the fact that the initial TCE concentration in SDS solution was 220 ppm higher than the "DOWFAX" solution.

VOCs Removal from Surfactant-Flushed Water Containing Polymers and Alcohol

In the second phase of the research, the efficacy and suitability of the hollow fiber membrane-based pervaporation process for the treatment of suitably designed simulated groundwater flushings were investigated. In this particular case, in addition to the VOC (TCE), the feed contained isopropyl alcohol (IPA) and the hydrophilic polymer gum xanthan. Both components are used to enhance the performance of the middle phase (microemulsion), increase the viscosity of the micellar system and, thus, the capillary number which in turn enhances the wetting phenomenon of the soil porous structure.

Figure 11:
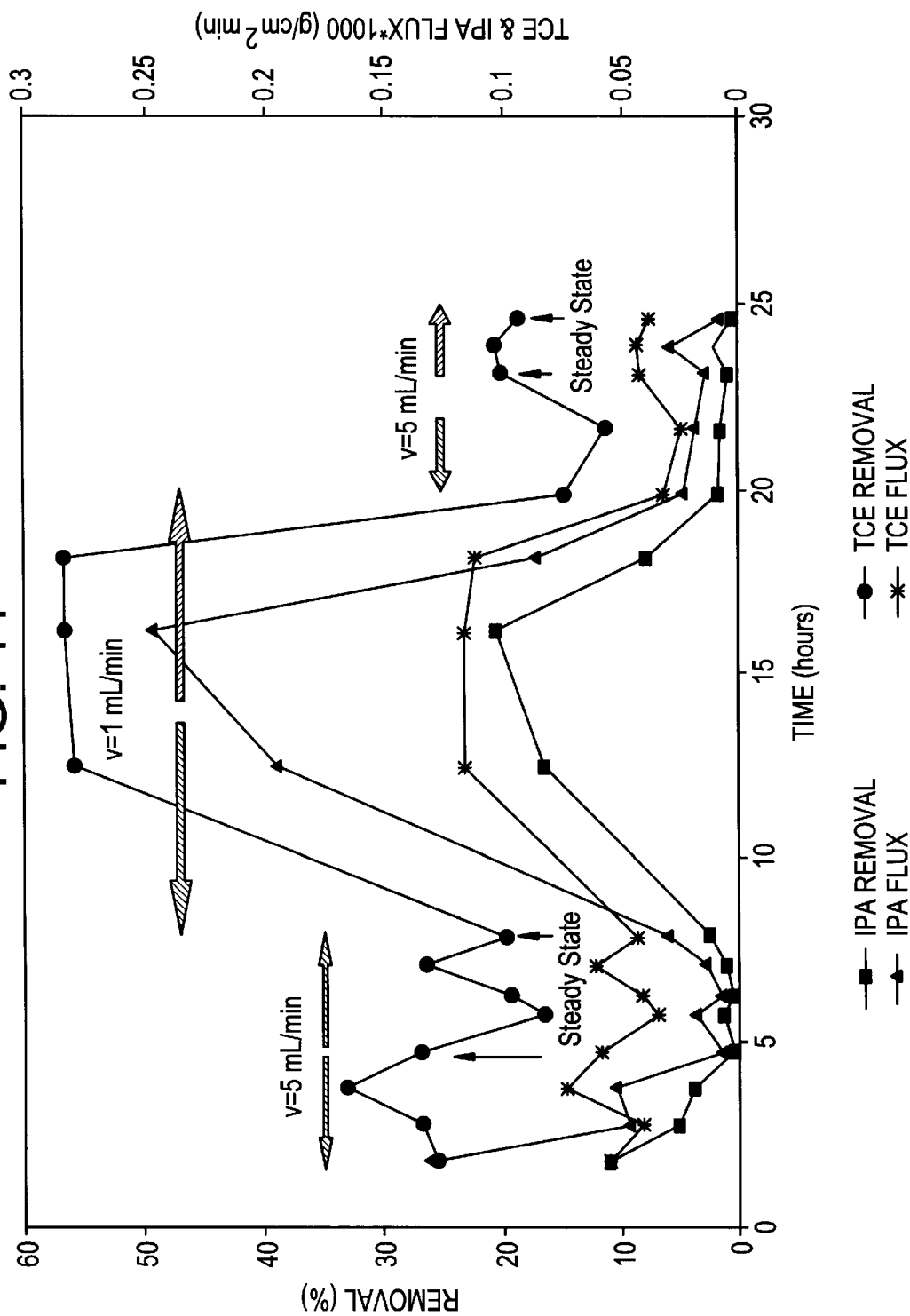
FIG. 11 shows the results of an extended term laboratory test of the present invention.

FIG. 11 represents the removal of IPA and TCE versus time. The purpose of this 25-hour run was to study the extended time performance of module #1. The flow rate was varied from 5 mL/min to 1 mL/min overnight. During this period, no change in the flux of IPA and TCE was observed. The module performance at hours 6–9 was identical to that at hours 22–24. The removal of TCE and IPA was sustained at the same level 20–23% and 2–3% respectively. The large peaks in the middle of the chart correspond to the night shift when the feed flow rate was intentionally reduced, which resulted in a higher removal of TCE and IPA due to the higher residence time.

Removal of VOCs from Surfactant-Flushed Groundwater Sample

Further experimentation focused on the efficacy of the present invention to treat a real sample of surfactant-flushed water from the site remediation experiments. The GC-MS analysis indicated that the wastewater contained more than 50 chemical compounds and contaminants.

Figure 12:
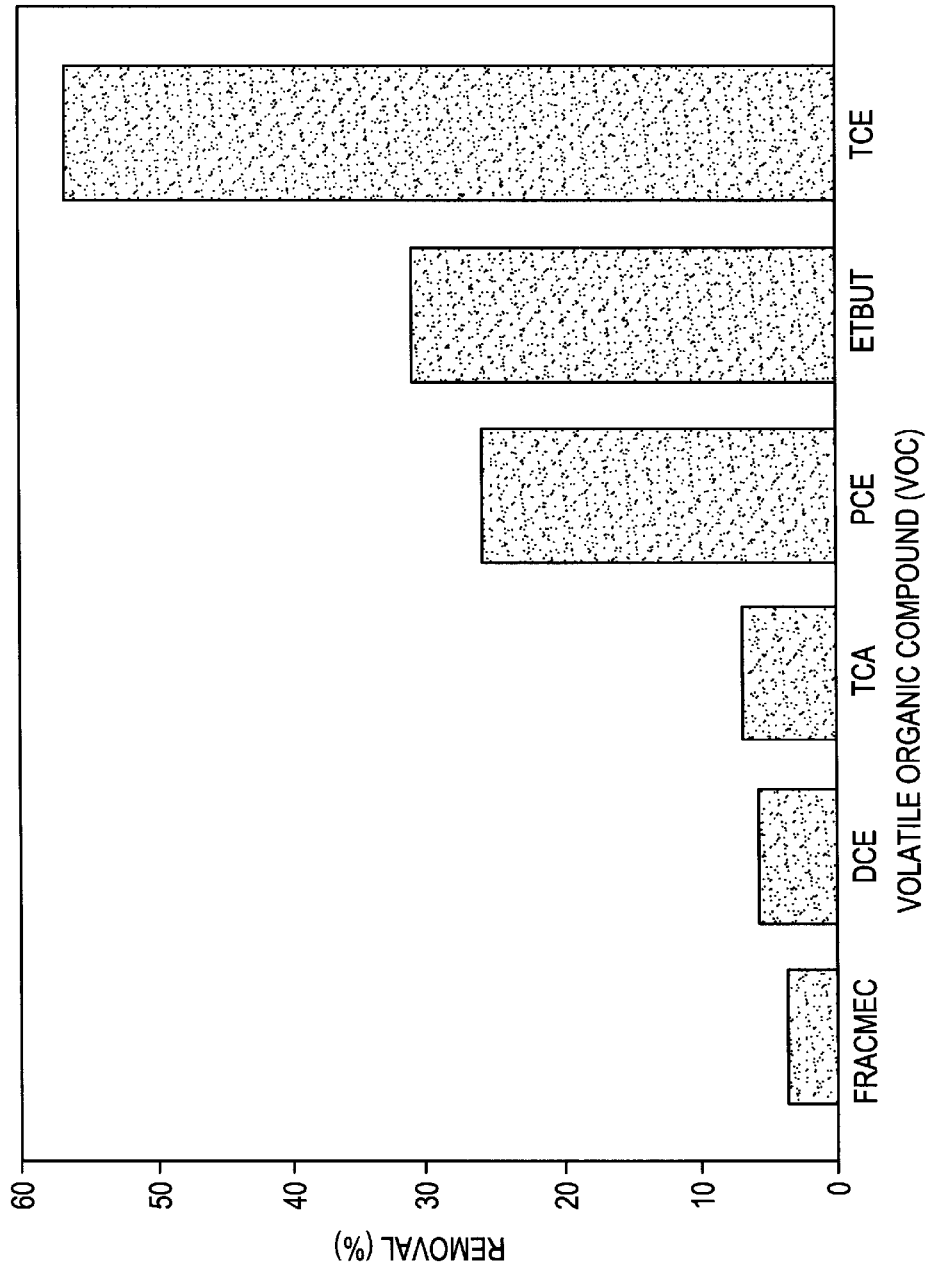
FIG. 12 shows the performance of the present invention with an actual wastewater sample; and, FIG. 13 shows the percentage of the removal of volatile organic compounds with the present invention from a multicomponent aqueous solution containing a surfactant in a pilot scale with a 2 inch diameter module.

FIG. 12 displays the major components present in significant concentrations. For example, TCE concentration was around 2000 ppm and was the main contaminant of this sample. A series of experimental runs were conducted using module #2. The removal of LNAPLs such as Freons, acetone and methylene chloride (FRACMEC) was about 5% and was the lowest among other VOCs. The removal of DNAPLs like dichloroethylene, trichloromethane and perchloroethylene was 7, 8 and 27% respectively. The highest removal was obtained for TCE where more than 57% was removed from this feed. 2-ethyl-1-butanol (ETBUT) present in the sample was also significantly removed (31%). The list of contaminants can be extended to IPA, heptanol, styrene, etc., which were equally removed. The removal of each particular contaminant is not necessarily determined only by its concentration in the sample; it also depends on the diffusion coefficient, hydrodynamics, membrane permeability and the volatility of VOC.

Pilot Scale Trials for VOCs Separation from Surfactant-Flushed Groundwater

Figure 13:
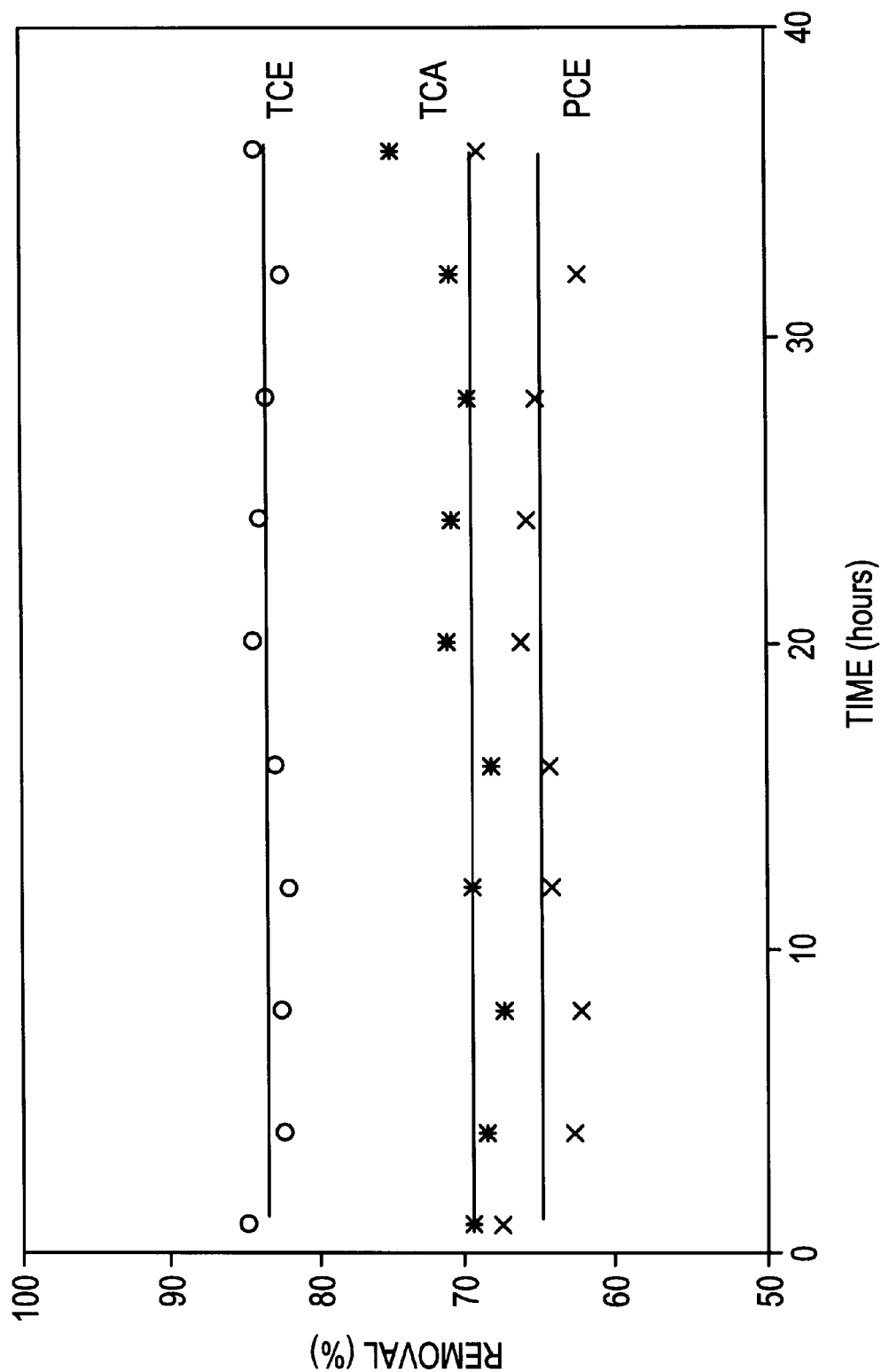

In this series of experimental trials, the objective was to demonstrate that the present technique is readily usable for larger scale applications and can treat multicomponent waste streams of unknown complexity. The contaminated feed was surfactant-flushed water obtained from a remediation site at the Hill Air Force Base, Utah; the pilot plant testing was at the EPA-Cincinnati T & E Facility using this wastewater trucked in by a tanker. The feed composition was a mosaic of oils and grease, VOCs and solvents and sodium bis-2-ethylhexylsulfosuccinate (AOT) as a surfactant. The major contaminants TCE, TCA and PCE concentrations were 3000, 600 and 500 ppm respectively. Two 2" diameter hollow fiber modules containing 10,000 hollow fiber membrane composites each were used in series at a wastewater flow rate of 0.25 gpm (gallons/min.) The results of the removal of VOCs are depicted in FIG. 13. The VOCs removal was sustained at a constant level throughout a 36-hour continuous run and was equal to 84, 70 and 65% for TCE, TCA and PCE respectively. Unlike VOCs, e.g., TCE, the nonvolatiles such as lubricating oils and others were collected as a liquid in an oil trap. The system was run every day for a period of three weeks without washing or cleaning the membrane modules. No pressure drop increase was observed during the runs.

CONCLUSIONS

It has been demonstrated that the present invention is a viable and scalable process and assembly for removing components such as volatile organic compounds from a multicomponent aqueous solution containing a surfactant. Moreover, the present invention has been demonstrated to be a viable and scalable process and assembly for the separation and recovery of VOCs and oils from different aqueous waste streams and waters obtained from surfactant-enhanced ground water remediation sites.

The percent removal of a VOC was defined as follows:

$$R\ (\%) = (1 - C/C_f) \times 100$$

where: $C$, $C_f$ are the VOC concentrations in the retentate and feed respectively.

Many other variations and modifications of the present invention will be apparent to those skilled in the art without departing from the spirit and scope of the invention.

The above-described embodiments are, therefore, intended to be merely exemplary, and all such variations and modifications are intended to be included within the scope of the present invention as defined in the appended claims.

Notation

| | |
|---|---|
| $A_m =$ | membrane area based on fiber outside diameter, (cm$^2$) |
| $B_j =$ | coefficient in the jth term of an infinite series [skelland, supra.] |
| $c_i =$ | mean speed of molecules, (cm/s) |
| $C_{il}' =$ | bulk phase feed concentration of species i, (gmol/cc) |
| $C_{ili}' =$ | concentration of species i in the aqueous feed phase at the aqueous-pore gas interface, (gmol/cc) |
| $C_{igi}' =$ | concentration of species i in the vapor phase at the aqueous-pore gas interface, (gmol/cc) |
| $C_{igmi}' =$ | concentration of species i in the vapor phase at the pore gas-silicone membrane interface, (gmol/cc) |
| $C_{imi}' =$ | concentration of species i in the membrane at the pore gas-silicone membrane interface, (gmol/cc) |
| $C_{imi}'' =$ | concentration of species i in the membrane at the silicone membrane-vacuum side interface, (gmol/cc) |
| $C_{imp}'' =$ | concentration of species i in the vacuum side at the silicone membrane-vacuum side interface, (gmol/cc) |
| $C_{ip}'' =$ | bulk concentration of species i in the vacuum side, (gmol/cc) |
| $C_{ipl}'' =$ | hypothetical equilibrium liquid phase concentration in equilibrium with the vacuum side gas phase, (gmol/cc) |
| $C_{inlet} =$ | feed concentration of TCE, (gmol/cc) |
| $C_{outlet} =$ | feed outlet concentration of TCE, (gmol/cc) |
| $C^p_{inlet} =$ | hypothetical permeate aqueous concentration of TCE at feed inlet location in equilibrium with the vacuum phase, (gmol/cc) |
| $C^p_{outlet} =$ | hypothetical permeate aqueous concentration of TCE at feed outlet location in equilibrium with the vacuum phase, (gmol/cc) |
| $\Delta C_{im} =$ | logarithmic mean concentration of TCE as defined by Eq. (9), (gmol/cc) |
| $d_i =$ | inner diameter of Celgard hollow fiber, (cm) |
| $d_o =$ | outer diameter of Celgard hollow fiber, (cm) |
| $d_{lm} =$ | logarithmic mean diameter of Celgard hollow fiber, $\dfrac{(d_0 - d_i)}{\ln(d_0 / d_i)}$, (cm) |
| $D_{il} =$ | diffusion coefficient of TCE in water, (cm$^2$/s) |
| $H_i =$ | Henry's law constant for species i defined by eqn(1), (mg/L)$_{liq}$/(mg/L)$_{vap}$ |
| $J_i =$ | permeation flux of species i, (gmol/cm$^2$ min) |
| $J_w =$ | permeation flux of water, (gmol/cm$^2$ min) |
| $K_o =$ | overall mass transfer coefficient defined by Eq.(8), (cm/s) |
| $k^fl =$ | aqueous phase mass transfer coefficient for mass transfer across the feed side boundary layer, (cm/s) |
| $k_m -$ | mass transfer coefficient for mass transfer across the membrane, (cm/s) |
| $l =$ | active length of the module, (cm) |
| $m_{vf} =$ | distribution coefficient of TCE between the membrane and the gaseous phase |
| $N =$ | number of hollow fibers |
| $Q =$ | volumetric flow rate (cc/min) |
| $r_i =$ | radius of a tube, (cm) |
| $R_i =$ | permeation rate of species i per unit permeator length, (gmol/cm s) |
| $Re =$ | Reynolds number as defined by Eq.(6) |
| $Sc =$ | Schmidt number defined as $\dfrac{\mu_i}{\rho_i D_v}$ |
| $Sh =$ | Sherwood number as defined by Eq.(10) |
| $t =$ | time, (s) |
| $v =$ | linear velocity of the feed, (cm/s) |
| $V_{TCE} =$ | volume of TCE collected, (cc) |
| $V_{H2O} =$ | volume of water collected, (cc) |
| Greek symbols | |
| $\delta_x =$ | fibrous substrate thickness, (cm) |
| $\epsilon =$ | porosity of the Celgard fibers |
| $\pi =$ | 3.1416 |
| $\rho_{H2O} =$ | density of water, (g/cc) |
| $\rho_{TCE} =$ | density of TCE, (g/cc) |
| $\mu_{H2O} =$ | viscosity of water, (g/cm s) |

What is claimed is:

1. A process for selectively removing a component from a multicomponent aqueous solution, by which said process is practiced by use of an assembly comprising: a feed chamber for holding and introducing said multicomponent aqueous solution to be treated therein, said feed chamber having a pressure; an exit chamber having a pressure, and located adjacent to said feed chamber and downstream thereof; at least one membrane composite located between said feed chamber and said exit chamber and adapted for fluid registry therewith, said membrane composite comprised of a porous membrane having a first and second surface, and a nonporous membrane permanently disposed on said second surface of the porous membrane, and having a permeability selective to said component, said membrane composite aligned such that said nonporous membrane is connected to said exit chamber and said first surface of said porous membrane is connected to said feed chamber; and an evacuation means connected to said exit chamber for evacuating said component from said exit chamber; the process comprising the steps of:

introducing said multicomponent aqueous solution into said feed chamber; evacuating said component from said exit chamber, so that the pressure in said exit chamber is less than the pressure in said feed chamber;

contacting said multicomponent aqueous solution with said first surface of said porous membrane.

2. The process for selectively removing a component from a multicomponent aqueous solution as set forth in claim 1, wherein said porous membrane is symmetrical in structure.

3. The process for selectively removing a component from a multicomponent aqueous solution as set forth in claim 1, wherein said porous membrane is asymmetrical in structure.

4. The process for selectively removing a component from a multicomponent aqueous solution as set forth in claim 3, wherein a shell surrounds said membrane composite, said porous membrane is a hollow fiber having a bore, an inner surface, and an outer surface, such that said inner surface corresponds to said first surface of said porous membrane, said outer surface corresponds to said second surface of said porous membrane, said bore corresponds to said feed chamber, and said exit chamber surrounds said hollow fiber and is defined by said shell and said nonporous membrane permanently disposed on said outer surface of said hollow fiber.

5. The process for selectively removing a component from a multicomponent aqueous solution as set forth in claim 2, 3, or 4, wherein said porous membrane is a hydrophobic microporous membrane.

6. The process for selectively removing a component from a multicomponent aqueous solution as set forth in claim 5, wherein said hydrophobic microporous membrane is made of a material selected from the group consisting of polypropylene, polyethylene, polytrimethylpentene, polytetrafluoroethylene, polyvinylidene difluoride, and polysulfone.

7. The process for selectively removing a component from a multicomponent aqueous solution as set forth in claim 6, wherein said hydrophobic microporous membrane is made of polypropylene.

8. The process for selectively removing a component from a multicomponent aqueous solution as set forth in claim 7, wherein pores in said hydrophobic microporous membrane have a size in the range of about 6 to about 500 Å.

9. The process for selectively removing a component from a multicomponent aqueous solution as set forth in claim 2, 3, or 4, wherein said nonporous membrane is made of a nonporous rubbery material.

10. The process for selectively removing a component from a multicomponent aqueous solution as set forth in claim 9, wherein said nonporous rubbery material is selected from the group consisting of polydimethylsiloxane (silicone rubber), nitrile rubber, neoprene rubber, silicone-polycarbonate copolymers, fluoroelastomers, polyurethane, polyvinylchloride, polybutadiene, polyolefin elastomers, polyesters, and polyethers.

11. The process for selectively removing a component from a multicomponent aqueous solution as set forth in claim 10, wherein said nonporous rubbery material is an ultrathin layer of plasma polymerized nonporous silicone.

12. The process for selectively removing a component from a multicomponent aqueous solution as set forth in claim 1, further comprising a condensing means connected to said exit chamber and said evacuation means.

13. The process for selectively removing a component from a multicomponent aqueous solution as set forth in claim 12, said process further comprising the step of condensing said component evacuated from said exit chamber.

14. The process for selectively removing a component from a multicomponent aqueous solution as set forth in claim 13, wherein said porous membrane is symmetrical in structure.

15. The process for selectively removing a component from a multicomponent aqueous solution as set forth in claim 13, wherein said porous membrane is asymmetrical in structure.

16. The process for selectively removing a component from a multicomponent aqueous solution as set forth in claim 15, wherein a shell surrounds said membrane composite, and said porous membrane is a hollow fiber having a bore, an inner surface, and an outer surface, such that said inner surface corresponds to said first surface of said porous membrane, said outer surface corresponds to said second surface of said porous membrane, said bore corresponds to said feed chamber, and said exit chamber surrounds said hollow fiber and is defined by said shell and said nonporous membrane permanently disposed on said outer surface of said hollow fiber.

17. The process for selectively removing a component from a multicomponent aqueous solution as set forth in claim 14, 15, or 16, wherein said porous membrane is a hydrophobic microporous membrane.

18. The process for selectively removing a component from a multicomponent aqueous solution as set forth in claim 17, wherein said hydrophobic microporous membrane is made of a material selected from the group consisting of polypropylene, polyethylene, polytrimethylpentene, polytetrafluoroethylene, polyvinylidene difluoride, and polysulfone.

19. The process for selectively removing a component from a multicomponent aqueous solution as set forth in claim 18, wherein said hydrophobic microporous membrane is made of polypropylene.

20. The process for selectively removing a component from a multicomponent aqueous solution as set forth in claim 19, wherein pores in said hydrophobic microporous membrane have a size in the range of about 6 to about 500 Å.

21. The process for selectively removing a component from a multicomponent aqueous solution as set forth in claim 20, wherein said nonporous membrane is made of a nonporous rubbery material.

22. The process for selectively removing a component from a multicomponent aqueous solution as set forth in claim 21, wherein said nonporous rubbery material is selected from the group consisting of polydimethylsiloxane (silicone rubber), nitrile rubber, neoprene rubber, silicone-polycarbonate copolymers, fluoroelastomers, polyurethane, polyvinylchloride, polybutadiene, polyolefin elastomers, polyesters, and polyethers.

23. The process for selectively removing a component from a multicomponent aqueous solution as set forth in claim 22, wherein said nonporous rubbery material is plasma polymerized nonporous silicone.

24. The process for selectively removing a component from a multicomponent aqueous solution as set forth in claim 23, wherein said pressure in said exit chamber is about −27 to about −29.0 or more inch Hg, and said pressure in said feed chamber is approximately 7 to approximately 30 psig.

25. The process for selectively removing a component from a multicomponent aqueous solution as set forth in claim 24, wherein said component is a volatile organic compound.

26. The process for selectively removing a component from a multicomponent aqueous solution as set forth in claim 25, wherein said membrane composite is positioned so that it is at an angle to the horizontal.

27. The process for selectively removing a component from a multicomponent aqueous solution as set forth in claim 26, wherein said component further comprises a high boiling point oil and said shell has a bottom exit for removing said high boiling point oil from said exit chamber.

28. An assembly for selectively removing a component from a multicomponent aqueous solution, said assembly comprising:

a feed chamber for holding and introducing said multicomponent aqueous solution to be treated therein, said feed chamber having a pressure;

an exit chamber having a pressure and located adjacent to said feed chamber and downstream thereof, at least one membrane composite located between said feed chamber and said exit chamber and adapted for fluid registry therewith, said membrane composite comprised of a porous membrane having a first and second surface, and a nonporous membrane permanently disposed on said second surface of said porous membrane, and having a permeability selective to said component, said membrane composite aligned such that said nonporous membrane is connected to said exit chamber and said first surface of said porous membrane is connected to said feed chamber; and an evacuation means connected to said exit chamber for evacuating said component from said exit chamber so that said pressure in said exit chamber is less than the pressure in said feed chamber.

29. The assembly for selectively removing a component from a multicomponent aqueous solution as set forth in claim 28, wherein said porous membrane is symmetrical in structure.

30. The assembly for selectively removing a component from a multicomponent aqueous solution as set forth in claim 28, wherein said porous membrane is asymmetrical in structure.

31. The assembly for selectively removing a component from a multicomponent aqueous solution as set forth in claim 30, wherein a shell surrounds said membrane composite, said porous membrane is a hollow fiber having a bore, an inner surface, and an outer surface, such that said inner surface corresponds to said first surface of said porous membrane, said outer surface corresponds to said second surface of said porous membrane, said bore corresponds to said feed chamber, and said exit chamber surrounds said hollow fiber and is defined by said shell and said nonporous membrane permanently disposed on said outer surface of said hollow fiber.

32. The assembly for selectively removing a component from a multicomponent aqueous solution of either of claims 30 or 31, wherein said porous membrane is a hydrophobic microporous membrane.

33. The assembly for selectively removing a component from a multicomponent aqueous solution as set forth in claim 32, wherein said hydrophobic microporous membrane is made of a material selected from the group consisting of polypropylene, polyethylene, polytrimethylpentene, polytetrafluoroethylene, polyvinylidene difluoride, and polysulfone.

34. The assembly for selectively removing a component from a multicomponent aqueous solution as set forth in claim 33, wherein said hydrophobic microporous membrane is made of polypropylene.

35. The assembly for selectively removing a component from a multicomponent aqueous solution as set forth in claim 34, wherein pores in said hydrophobic microporous membrane have a size in the range of about 6 to about 500 Å.

36. The assembly for selectively removing a component from a multicomponent aqueous solution as set forth in claim 35 wherein said nonporous membrane is made of a nonporous rubbery material.

37. The assembly for selectively removing a component from a multicomponent aqueous solution as set forth in claim 36, wherein said nonporous rubbery material is selected from the group consisting of polydimethylsiloxane (silicone rubber), nitrile rubber, neoprene rubber, silicone-polycarbonate copolymers, fluoroelastomers, polyurethane, polyvinylchloride, polybutadiene, polyolefin elastomers, polyesters, and polyethers.

38. The assembly for selectively removing a component from a multicomponent aqueous solution as set forth in claim 37, wherein said nonporous rubbery material is an ultrathin layer of plasma polymerized nonporous silicone.

39. The assembly for selectively removing a component from a multicomponent aqueous solution as set forth in claim 38, wherein said pressure in said exit chamber is about −27 to about −29.0 or more inch Hg, and said pressure in said feed chamber is approximately 7 to approximately 30 psig.

40. The assembly for selectively removing a component from a multicomponent aqueous solution as set forth in claim 39, wherein said component is a volatile organic compound.

41. The assembly for selectively removing a component from a multicomponent aqueous solution as set forth in claim 40, wherein said membrane composite is positioned so that it is at an angle to the horizontal.

42. The assembly for selectively removing a component from a multicomponent aqueous solution as set forth in claim 41, wherein said component further comprises a high boiling point oil, and said shell has a bottom exit for removing said high boiling point oil from said exit chamber.

* * * * *